(12) United States Patent
Alabbasi et al.

(10) Patent No.: US 11,026,143 B2
(45) Date of Patent: Jun. 1, 2021

(54) NETWORK UNIT AND METHODS THEREIN FOR DETERMINING A TARGET RADIO NETWORK NODE

(71) Applicant: Telefonaktiebolaget LM Ericsson (publ), Stockholm (SE)

(72) Inventors: Abdulrahman Alabbasi, Kista (SE); Osama Al-Saadeh, Kista (SE); Jonas Fröberg Olsson, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 228 days.

(21) Appl. No.: 16/319,395

(22) PCT Filed: Oct. 25, 2018

(86) PCT No.: PCT/SE2018/051093
§ 371 (c)(1),
(2) Date: Jan. 21, 2019

(87) PCT Pub. No.: WO2020/085963
PCT Pub. Date: Apr. 30, 2020

(65) Prior Publication Data
US 2020/0404561 A1  Dec. 24, 2020

(51) Int. Cl.
*H04W 36/30* (2009.01)
*H04W 36/08* (2009.01)
(Continued)

(52) U.S. Cl.
CPC .......... *H04W 36/08* (2013.01); *H04W 16/14* (2013.01); *H04W 24/10* (2013.01); *H04W 36/30* (2013.01);
(Continued)

(58) Field of Classification Search
CPC ..... H04W 28/28; H04W 28/20; H04W 28/22; H04W 28/24; H04W 28/26; H04W 36/00;
(Continued)

(56) References Cited

U.S. PATENT DOCUMENTS

| | | | | |
|---|---|---|---|---|
| 10,630,410 | B2 * | 4/2020 | Parkvall | H04L 5/0053 |
| 2015/0181493 | A1 * | 6/2015 | Park | H04W 36/08 |
| | | | | 455/436 |

(Continued)

FOREIGN PATENT DOCUMENTS

| | | |
|---|---|---|
| EP | 1811800 A1 | 7/2007 |
| WO | 2002041646 A2 | 5/2002 |

OTHER PUBLICATIONS

Khan, F. et al, "Backhaul, QoS, and Channel-aware Load Balancing Optimization in SDN-based LTE Networks", 2017 11th International Conference on Signal Processing and Communication Systems (ICSPCS), Dec. 13, 2017, pp. 1-10, IEEE.

(Continued)

*Primary Examiner* — Jean A Gelin
(74) *Attorney, Agent, or Firm* — Coats + Bennett, PLLC

(57) ABSTRACT

A method performed by a network unit (140) for determining a target radio network node (112). The network unit (140) and the target radio network node (112) are operating in a wireless communications network (100). The network node determines the target radio network node (112) as one radio network node out of a group of radio network nodes (110, 112, 112') operating in the wireless communications network (100) and which one radio network node has a combination of a quality of a radio channel to a wireless device (120) and an amount of computational resources available for serving the wireless device (120), which combination is better than the other radio network nodes out of the group of radio network nodes (110, 112, 112'). The target (Continued)

Method performed by network unit 140 radio network node (112) is for association with the wireless device (120) served by a serving radio network node (110).

15 Claims, 10 Drawing Sheets

(51) Int. Cl.
*H04W 16/14* (2009.01)
*H04W 24/10* (2009.01)
*H04W 88/06* (2009.01)
*H04W 88/08* (2009.01)
*H04W 92/12* (2009.01)

(52) U.S. Cl.
CPC ......... *H04W 88/06* (2013.01); *H04W 88/085* (2013.01); *H04W 92/12* (2013.01)

(58) Field of Classification Search
CPC ..... H04W 36/08; H04W 36/18; H04W 36/22; H04W 36/24; H04W 36/30; H04W 48/20; H04W 40/04; H04W 72/0486; H04W 72/10; H04W 76/00; H04W 76/12; H04L 12/6418; H04L 45/302; H04L 47/2416; H04L 47/2441
See application file for complete search history.

(56) References Cited

U.S. PATENT DOCUMENTS

| | | | |
|---|---|---|---|
| 2015/0215767 A1* | 7/2015 | Siomina | H04W 76/14 |
| | | | 455/435.2 |
| 2015/0334716 A1 | 11/2015 | Coffman | |
| 2018/0368140 A1* | 12/2018 | Centonza | H04W 72/0426 |
| 2019/0037640 A1* | 1/2019 | Xiong | H04W 88/06 |
| 2019/0222967 A1* | 7/2019 | Ratilainen | H04L 1/0011 |
| 2019/0364388 A1* | 11/2019 | Busin | H04W 64/00 |
| 2020/0305041 A1* | 9/2020 | Fan | H04W 74/0833 |
| 2020/0322873 A1* | 10/2020 | Zachrison | H04W 48/06 |

OTHER PUBLICATIONS

Alexandris, K. et al., "Load-aware Handover Decision Algorithm in Next-generation HetNets", IEEE Wireless Communications and Networking Conference (WCNC 2016)—Track 3—Mobile and Wireless Networks, Sep. 15, 2016, pp. 1-6, IEEE.
Wang, H. et al., "QoS-Aware Load Balancing in 3GPP Long Term Evolution Multi-Cell Networks", 2011 IEEE International Conference on Communications (ICC), Jun. 5, 2011, pp. 1-5, IEEE.
Ericsson, "Conditional Handover", 3GPP TSG-RAN WG2 #97bis, Spokane, USA, Apr. 3, 2017, pp. 1-5, Tdoc R2-1702675, 3GPP.
Internationa Telecommunication Union, "GSTR-TN5G; Transport network support of IMT-2020/5G", ITU-T Technical Report, Feb. 9, 2018, pp. 1-21, ITU.

* cited by examiner

Fig. 2 Method performed by network unit 140

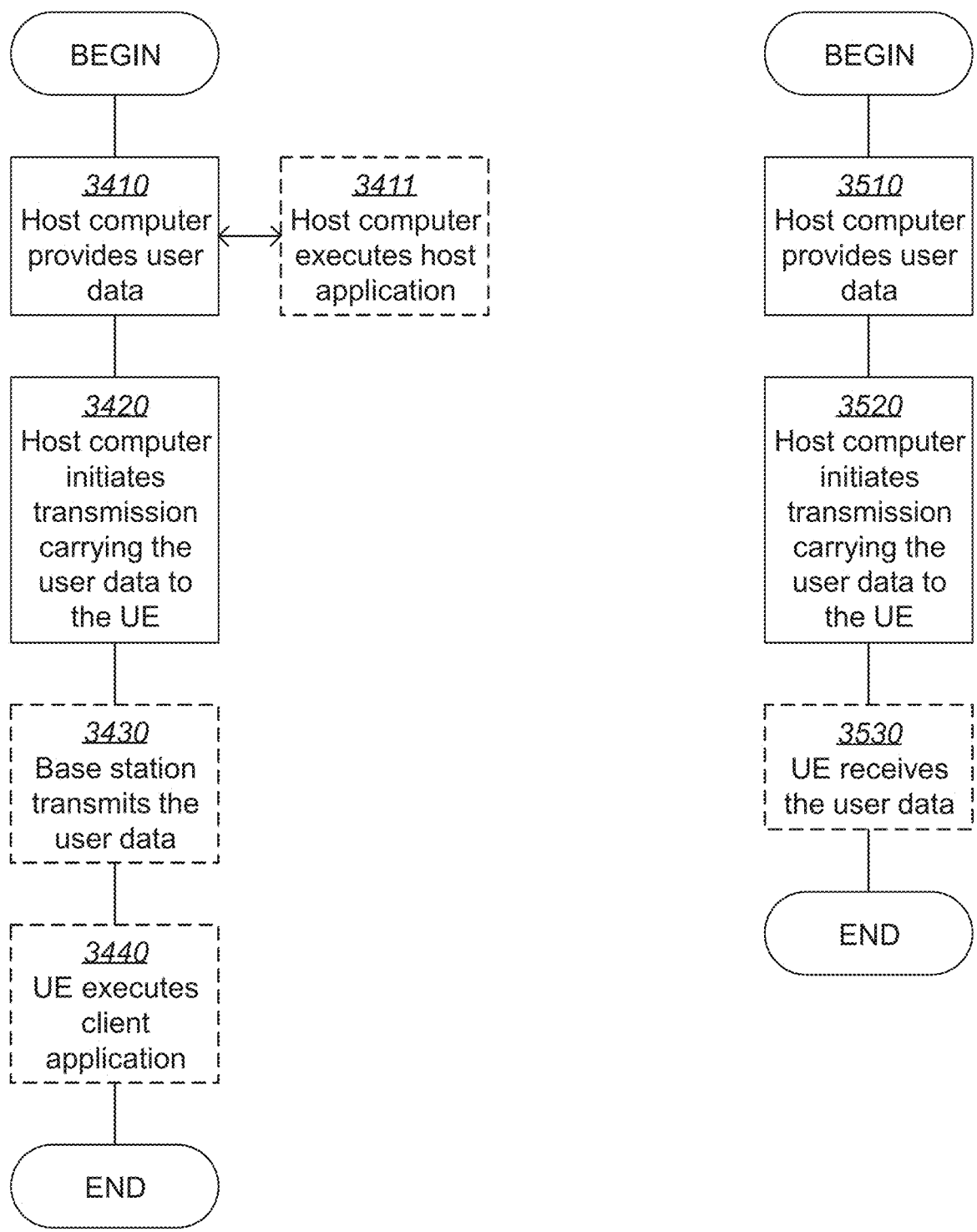

NETWORK UNIT AND METHODS THEREIN FOR DETERMINING A TARGET RADIO NETWORK NODE

TECHNICAL FIELD

Embodiments herein relate to a network unit and to a method therein. Especially, embodiments herein relate to determination of a target radio network node.

BACKGROUND

Communication devices such as wireless communication devices, that simply may be named wireless devices, may also be known as e.g. User Equipments (UEs), mobile terminals, wireless terminals and/or Mobile Stations (MS). A wireless device is enabled to communicate wirelessly in a wireless communication network, e.g. a cellular communications network, which may also be referred to as a wireless communication system, or radio communication system, sometimes also referred to as a cellular radio system, cellular network or cellular communication system. A wireless communication network may sometimes simply be referred to as a network and abbreviated NW. The communication may be performed e.g. between two wireless devices, between a wireless device and a regular telephone and/or between a wireless device and a server via a Radio Access Network (RAN) and possibly one or more Core Networks (CN), comprised within the wireless communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type Communication (MTC) devices, i.e. a device that is not necessarily associated with a conventional user, such as a human, directly using the device. MTC devices may be as defined by the 3rd Generation Partnership Project (3GPP).

The wireless device may be, for example, portable, pocket-storable, hand-held, computer-comprised, or vehicle-mounted mobile device, enabled to communicate voice and/or data, via the RAN, with another entity, such as another wireless device or a server.

The wireless communication network covers a geographical area which conventionally is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby e.g. also on cell size. A cell is typically identified by one or more cell identities. The base station at a base station site provides radio coverage associated with one or more cells and/or beams. Beams are further discussed below. A cell and beam may thus be associated with geographical areas, respectively, where radio coverage for the cell and beam, respectively, is provided by a base station at a base station site. Cells and/or beams may overlap so that several cells and/or beams cover the same geographical area. By a base station providing or serving a cell and/or beam is meant that the base station provides radio coverage such that one or more wireless devices located in the geographical area where the radio coverage is provided may be served by the base station in said cell and/or beam. When a wireless device is said to be served in or by a cell and/or beam this implies that the wireless device is served by the base station providing radio coverage for the cell and/or beam. One base station may serve one or several cells and/or beams. Further, each base station may support one or several communication technologies. The base stations communicate over the air interface operating on radio frequencies with the wireless device within range of the base stations.

The expression downlink, which may be abbreviated DL, is used for the transmission path from the wireless communication network, e.g. a base station thereof, to the wireless device. The expression uplink, which may be abbreviated UL, is used for the transmission path in the opposite direction i.e. from the wireless device to the wireless communication network, e.g. base station thereof.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Spécial Mobile).

In 3GPP Long Term Evolution (LTE), base stations, which may be referred to as eNodeBs or eNBs, may be directly connected to other base stations and may be directly connected to one or more core networks.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices.

General Packet Radio Service (GPRS) is a packet oriented mobile data service on the 2G cellular communication system's global system for mobile communications (GSM).

Enhanced Data rates for GSM Evolution (EDGE) also known as Enhanced GPRS (EGPRS), or IMT Single Carrier (IMT-SC), or Enhanced Data rates for Global Evolution is a digital mobile phone technology that allows improved data transmission rates as a backward-compatible extension of GSM.

High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The 3GPP has undertaken to evolve further the UTRAN and GSM based radio access network technologies, for example into evolved UTRAN (E-UTRAN) used in LTE.

Work is ongoing with developing a next generation wide area networks, which may be referred to as NeXt generation (NX), New Radio (NR), or fifth generation (5G). A design principle under consideration for 5G wireless communication networks is to base it on an ultra-lean design. This implies that "always on signals", such as reference signals in LTE, shall be avoided in the network as much as possible. Expected benefits from this design principle include e.g. significantly lower network energy consumption, better scalability, higher degree of forward compatibility, lower interference from system overhead signals and consequently higher throughput in low load scenario, and also improved support for wireless device, or so called user, centric beamforming.

Advanced Antenna Systems (AAS) is an area where technology has advanced significantly in recent years and where we also foresee a rapid technology development in the years to come. Advanced antenna systems in general and massive Multiple Input Multiple Output (MIMO) transmission and reception will likely be used in future wireless communication network and in 5G wireless communication networks.

A beam, such as mentioned above, is traditionally associated with transmission using so called beamforming, typically by means of a phase-adjustable, or phased, antenna array, the same underlying technique is equally applicable to reception. Beamforming, or spatial filtering, may be described as a signal processing technique for directional signal transmission and/or reception. This is typically achieved by combining elements in the phased antenna array, often referred to simply as a phased array, in such a way that signals at particular angles experience constructive interference while others experience destructive interference. Beamforming can be used at both the transmitting and receiving ends in order to achieve spatial selectivity. Thereby, thanks to directivity, improvements are possible to achieve compared with omnidirectional reception and/or transmission. For example, a transmitter may perform transmit beamforming by transmitting the same signal on all elements of a phased array, except for a per-element weight comprising a phase shift and an amplitude factor. Similarly, a receiver with an phased array, that may be the same and/or configured in the same way as of the transmitter, may perform receive beamforming by applying per-element weights and adding the resulting signals before further processing. The selectivity and directivity may thus be the same in transmission and reception. For transmission, it means that the signal will be stronger in some direction or directions and weaker in others. For reception, it means that signals from some direction or directions are amplified and those from other directions are attenuated, relative to each other. The same antenna may be used, i.e. operated, for transmission and reception although typically not at the same time.

Beams and beamforming may be applied in the uplink and/or downlink, and at both communication ends or only at one communication end. For example, in the downlink regarding communication between a wireless communication network and a communication device, the wireless communication network may use transmit beamforming and/or the wireless communication device may use receive beamforming. Correspondingly, in the uplink regarding communication between a wireless communication network and a wireless communication device, the wireless communication network may use receive beamforming and/or the wireless communication device may use transmit beamforming. Synonymous naming for transmit beamforming may be transmission beamforming or transmitting beamforming and synonymous naming for receive beamforming may be reception beamforming or receiving beamforming. Conventionally when referring to a beam, a transmit beam is meant, i.e. a radio beam formed and/or generated by transmit beamforming. However, as can be realized from above, it may as well make sense to refer to receive beams, i.e. beams associated with receive beamforming. Herein, "beam" typically refers to a transmit beam if nothing else is indicated, as should be recognized by the skilled person.

Future communication systems are to support high demand on several parameters such as large throughput, low latency, higher energy efficiency, in addition to supporting heterogeneity of services requirements. These needs are the result of the need for the 5G NR communications system to support several verticals. By the expression "support several verticals" when used in this disclosure is meant that the 5G NR communications system supports different services sectors, such as energy, industry and/or manufacturing, eHealth, public safety, automotive, media, entertainment, smart cities, etc., just to give some examples. Additionally, heterogeneous service traffic and mixed services traffic, e.g. enhance Mobile BroadBand (eMBB), Ultra Reliable Low Latency Communications (URLLC) and massive Machine Type Communications (mMTC), would be expected to be generated from similar group of wireless devices or even from the same wireless device.

Industrial Internet of Things (IoT) and factory automation are examples of those verticals, of which wireless devices may require a mix of stringent services requirements of one or more out of: End-to-End (E2E) latency, reliability, capacity, or security. Increasing the bandwidth resources, e.g. by considering subGHz, Sub 6 GHz, and mmWave frequencies), to meet these services will put a considerable limitation on the gNB processing resources. By the expression E2E latency when used in this disclosure is meant the latency caused by all elements operating within the two ends of the communications network, i.e., the wireless device passing by the radio network node, e.g. the gNB that may be local or cloud, the core network, up to the Data center, e.g. clouds servers, of the services.

Below, two examples of a scenario, wherein the wireless devices may require a mix of stringent services requirements, are provided.

On one hand, such a scenario has several characteristics, among which is the high number of small packet users, e.g. industrial wireless devices such as sensors, and the stringent latency requirements, such as Programmable Logic Controller (PLC) based control or automation control. Each of these sensors does not require large bandwidth, yet similar processing per sub-frame is needed as compared to other services. Given the large bandwidth provided by the mmWave frequencies, a huge number of such sensors may be served. Hence, satisfying the associated huge processing demand, as compared to serving conventional services, will put a strain on the processing capability of the existing gNBs.

On the other hand, Mobile Edge Computing (MEC) has been proposed to satisfy heterogeneous service requirements. Some applications, e.g. including those for industrial use cases, require the communications networks to allocate processing units to accommodate the required computation. The MEC is about computing the UE requested services at a central cloud, e.g. at a gNB Central Unit (gNB-CU) or at an edge cloud, e.g. at a gNB Distributed Unit (gNB-DU). Increasing the heterogeneous services put a strain on the digital units at the gNB, hence the amount of available processing resources become much lower as compared to the amount of available bandwidth resources.

SUMMARY

As part of developing embodiments herein, some drawbacks with the state of the art communications networks will first be identified and discussed.

The future 5G communications network is expected to be efficient in supporting heterogeneous traffic requirements, such as varying requirements on latency, energy efficiency, and capacity, just to give some examples. However, current communications networks take into account the available radio link resources and bandwidth resources only for scheduling decisions which imposes limitation on the processing resources at the gNBs, and thus the current communications network are inefficient in supporting heterogeneous traffic requirements, e.g. different traffic requirements. Further, the current communication networks distribute all scheduling and communication protocol processing to radio network nodes causing them to be inefficient in supporting heterogeneous traffic requirements.

An object addressed by embodiments herein is how to improve performance in a wireless communications network.

According to an aspect of embodiments herein, the object is achieved by a method performed by a network unit for determining a target radio network node. The network unit and the target radio network node are operating in a wireless communications network.

The network unit determines the target radio network node as one radio network node out of a group of radio network nodes operating in the wireless communications network. The one radio network node has a combination of a quality of a radio channel to a wireless device and an amount of computational resources available for serving the wireless device, that is better than the other radio network nodes out of the group of radio network nodes.

The target radio network node is for association with the wireless device served by a serving radio network node.

According to another aspect of embodiments herein, the object is achieved by a network unit for determining a target radio network node. The network unit and the target radio network node are configured to operate in a wireless communications network.

The network unit is configured to determine the target radio network node as one radio network node out of a group of radio network nodes configured to operate in the wireless communications network. The one radio network node has a combination of a quality of a radio channel to a wireless device and an amount of computational resources available for serving the wireless device, that is better than the other radio network nodes out of the group of radio network nodes.

The target radio network node is configured for association with the wireless device served by a serving radio network node.

According to another aspect of embodiments herein, the object is achieved by a computer program, comprising instructions which, when executed on at least one processor, causes the at least one processor to carry out the method performed by the network unit.

According to another aspect of embodiments herein, the object is achieved by a carrier comprising the computer program, wherein the carrier is one of an electronic signal, an optical signal, a radio signal or a computer readable storage medium.

Since the network unit determines the target radio network node as one radio network node out of a group of radio network nodes operating in the wireless communications network and which one radio network node has a combination of a quality of a radio channel to a wireless device and an amount of computational resources available for serving the wireless device, that is better than the other radio network nodes out of the group of radio network nodes, also the amount of computational resources are taken into account when determining a suitable target radio network node for association with a wireless device served by a serving radio network node. In this way the processing load at the serving radio network node is alleviated or reduced by associating the wireless device from the serving radio network node to the target radio network node that is less loaded and has an acceptable radio channel quality that meets the wireless device's radio requirements. Thereby, an improved utilisation of the resources of the radio network nodes operating in the wireless communications network is provided. This results in an improved performance of the wireless communications network.

An advantage with some embodiments disclosed herein is that they enable flexible provision of heterogeneous services while meeting the heterogeneous services' requirements and alleviate the associated constraint on the radio network nodes' resources.

Another advantage with some embodiments disclosed herein is that they improve the control plane latency and/or the user plane latency by reducing the computational load at some radio network nodes and increasing the computational load at other radio network nodes.

BRIEF DESCRIPTION OF DRAWINGS

Examples of embodiments herein will be described in more detail with reference to attached drawings in which:

FIGS. 7 to 12 are flowcharts illustrating methods implemented in a communication system including a host computer, a base station and a user equipment.

DETAILED DESCRIPTION

Figure 1:
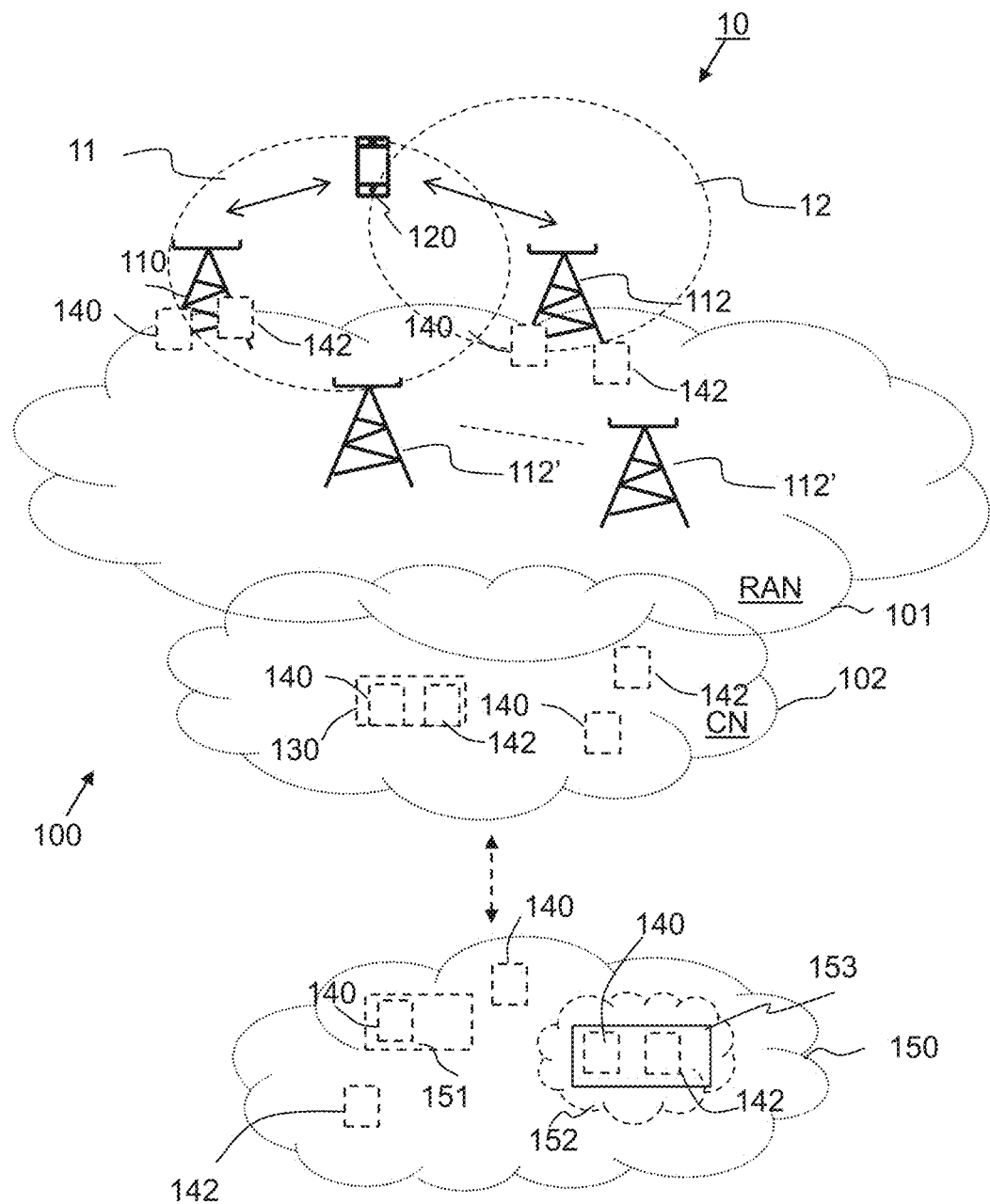
FIG. 1 schematically illustrates embodiments of a wireless communications network.

An aim of some embodiments disclosed herein is to overcome or mitigate at least some of the drawbacks with the prior art.

Embodiments disclosed herein provides for an improved utilization of resources, especially of a radio network node's resources. For example, this may be the case in scenarios wherein scheduling and schemes for wireless device to radio network node association might cause extra queuing delay at the radio network node. One part of the user plane latency is the processing time at the radio network node and at the wireless device. The processing time at the radio network node is caused by scheduling, encoding or decoding, and all functions in different communication protocol layers.

If a processing unit, also sometimes referred to as a Baseband Unit (BBU), of the radio network node is serving a large number of wireless devices in a first in first out (FIFO) manner, the last coming wireless devices will have to wait until the BBU serves the first coming wireless devices. This is referred to as a queuing delay. The queuing delay is caused by limited computational resources of the radio network node and by the large number of wireless devices in the queue. One reason of such large number of wireless devices is the large radio resources, e.g., extra bandwidth introduced by mmWave spectrum, at the radio network node, e.g. at a distributed unit of the radio network node.

To improve processing delay, and hence the queuing delay, some embodiments disclosed herein aim to free-up computational resources at the radio network node, e.g. a serving radio network node, that serves a large number of wireless devices in relation to its computation capabilities.

Some embodiments disclosed herein comprises two phases that will be described below.

In a first phase, an association methodology, e.g. a handover methodology, is provided to alleviate the computational resources at one or more of the radio network nodes, e.g. at one of more of the distributed units of the radio network nodes, having a high processing load. By the expression "high processing load" when is used in this disclosure is meant that the number of allocated CPUs to handle one or more on-going communications or services is larger than a certain threshold, e.g. a predefined threshold value. For example, the predefined threshold may a number of communication functions normalized to unit by e.g. Giga operations (GOPS). Thus, in the first phase, processing load at the serving radio network node is alleviated or reduced by associating, e.g. handing over, the wireless device from the serving radio network node to a radio network node that is less loaded and has an acceptable radio channel quality that meets the wireless device's radio requirements. For example, this may be to a radio network node having a second or third best radio channel.

In a second phase, a scheduling unit, e.g. a global scheduler, is provided. The scheduling unit may flexibly decide the allocation of one or more sub-schedulers at either a central unit of the radio network node, e.g. the gNB-CU, or a distributed unit of the radio network node, e.g. the gNB-DU, in order to meet the mixed services requirements. The global scheduler and the one or more sub-schedulers may sometimes be referred to as Communication Protocol Processing (CPP) units. The one or more CPP units assign the one or more BBUs to process the communication for a certain service.

Embodiments herein provide an improvement of wireless communications network by increasing the degree of freedom of existing scheduling algorithms and user association methodologies.

For example, some embodiments relate to the association of a wireless device with a target radio network node, e.g. a gNB. Thereby, a wireless device may be handed over from a serving radio network node to a target radio network node. The serving radio network node and the target radio network node may be distributed units, such as distributed units of radio network nodes, e.g. gNB-DUs.

In the 5G communications networks and in the communications networks beyond 5G, each radio network node extends to several sites and thereby each have a distributed unit and a central unit. These distributed and central units of each radio network node are sometimes in this disclosure referred to as gNB-DU and gNB-CU, respectively. Hence, some embodiments also comprise flexible allocation and/or scheduling of the wireless devices based on their associated services.

Note that although terminology from LTE is used in this disclosure to exemplify the embodiments herein, this should not be seen as limiting the scope of the embodiments herein to only the aforementioned system. Other wireless systems, such as for example a NR network, a 5G network, an LTE network, a Wideband Code Division Multiple Access (WCDMA) network, a Global System for Mobile Communications (GSM) network, any 3GPP cellular network, a Worldwide Interoperability for Microwave Access (WiMAX) network, a Wireless Local Area Network (WLAN), a Low Rate Wireless Personal Access Network (LR-WPAN) as defined in e.g. IEEE 802.15.4, a Bluetooth network, a SIGFOX network, a Zigbee network, a Bluetooth Low Energy (BLE) network such as a Bluetooth Smart network, or a Cellular Internet of Things (CIoT) network such as an Enhanced Coverage GSM-IoT (EC-GSM-IoT) network, a Narrow Band IoT (NB-IoT) network or a network comprising one or more wireless devices configured for Machine Type Communication (MTC) sometimes herein referred to as an eMTC network, may also benefit from exploiting the ideas covered within this disclosure.

In the following, embodiments herein are illustrated by exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

It should furthermore be noted that, to anyone skilled in the art, there are several realizations of the embodiments below with principally equivalent functionality.

In addition, it should be noted that message names, parameters, information elements and field names may change during the course of the specification work which implies that embodiments described herein still apply as long as the principal function and/or use is the same.

Some exemplifying embodiments will now be described in more detail.

FIG. 1 is a schematic block diagram schematically depicting an example of a wireless communications system 10 that is relevant for embodiments herein and in which embodiments herein may be implemented.

A wireless communications network 100 is comprised in the wireless communications system 10. The wireless communications network 100 may comprise a Radio Access Network (RAN) 101 part and a Core Network (CN) 102 part. The wireless communication network 100 is typically a telecommunication network, such as a cellular communication network that supports at least one Radio Access Technology (RAT). The wireless communications network 100 may be a NR network, a 5G network, an LTE network, a WCDMA network, a GSM network, any 3GPP cellular network, or a short range communications network, such as a WLAN, an LR-WPAN, a Bluetooth network, WiMAX network, a SIGFOX network, a Zigbee network, a BLE network such as a Bluetooth Smart network, or a CIoT network such as an EC-GSM-IoT network, a NB-IoT network or an eMTC network, or a combination of one or more of the aforementioned communications networks just to mention some examples.

The core network 102 may be an NR core network, a 5G core network, an LTE core network, a WCDMA core network, a GSM core network, any 3GPP cellular core network, or a short range communications core network, such as a WLAN core network, an LR-WPAN core network, a Bluetooth core network, WiMAX core network, a SIGFOX core network, a Zigbee core network, a BLE core network such as a Bluetooth Smart network, or a CIoT network such as an EC-GSM-IoT core network, a NB-IoT core network or an eMTC core network, or a combination of one or more of the aforementioned communications core networks just to mention some examples.

One or more radio network nodes 110,112,112' are configured to operate in the communication network 100. The radio network node 110,112,112' is configured for wireless communication with communications devices, e.g. communications devices such as a wireless device 120, when they are located within a service area 11,12, such as a coverage area e.g. a geographical area, served by the radio network node 110,112,112'. It should be understood that the radio network node 110,112,112' may serve or manage a plurality of service areas 11,12, even though only two is illustrated in FIG. 1 for clarity reasons. The one more service areas 11,12 are sometimes in this disclosure referred to as one or more cells 11,12.

The radio network node 110 of FIG. 1 is sometimes in this disclosure referred to as a serving radio network node 110 or a first radio network node 110, and the radio network node 112 is sometimes in this disclosure referred to as a neighbouring radio network node being a target radio network node 112. Further, the radio network node 112' of FIG. 1 is sometimes referred to as neighbouring radio network nodes 112'. Furthermore, in FIG. 1, the service area 11 is the service area of the serving radio network node 110, and the service area 12 is the service area of the target radio network node 112.

The radio network node 111,112,112' may be a transmission point such as a radio base station, for example a gNB, an E-UTRA node, an LTE eNB, an eNB, a Node B, or an Home Node B, an Home eNode B, a BTS or any other network node being capable to serve a communications device in a communications network, such as the communications network 100. The radio network node 111,112,112' may further be configured to communicate with the core network node 130. The 111,112,112' is sometimes in this disclosure referred to as just a network node 111,112,112'.

A wireless device 120 is operating in the wireless communications network 100. In some embodiments, one or more further wireless device (not shown) may be operating in the wireless communications network 100. In such embodiments, the wireless device 120 may be referred to as a first wireless device 120 and the one or more further wireless devices may be referred to as one or more second wireless devices.

The wireless device 120, also sometimes referred to as a wireless communications device, a communications device, a User Equipment (UE), a terminal, or a Mobile Station (MS), may be located in the wireless communications network 100. For example, the wireless device 120 may be an Internet of Things (IoT) device, a user equipment, a mobile terminal or a wireless terminal, a mobile phone, a computer such as e.g. a laptop, a Personal Digital Assistants (PDAs) or a tablet computer, with wireless capability, or any other radio network units capable to communicate over a radio link in a wireless communications network. It should be noted that the term user equipment used in this document also covers other wireless devices such as Machine to Machine (M2M) devices, even though they are not handled by any user.

Moreover, the wireless communication network 100 may comprise one or more central nodes, e.g. a central node 130 i.e. one or more network nodes that are common or central and communicatively connected to multiple other nodes, e.g. multiple radio network nodes, and may be configured for managing and/or controlling these nodes. The central nodes may e.g. be core network nodes, i.e. network nodes part of the CN 102.

A network unit 140 is operating in the wireless communications network 100. As will be described in more detail below, the network unit 140 may be comprised in a radio network node, e.g. in the serving radio network node 110 or the target radio network node 112. However, it should be understood that several radio network nodes may each comprise a respective network unit 140. The network unit 140 may be a distributed unit or a central unit of the radio network node. Further, the network unit 140 may be comprised in the CN 102, e.g. as a separate unit or in a central network node of the CN 102. Furthermore, the network unit 140 may be comprised in an external network, e.g. an external network 150 which will be described below. For example, the network unit 140 may be comprised in an external network node, e.g. an external network node 151 which will be described below. As another example, the network unit 140 may be comprised in a computer cloud, e.g. a computer cloud 152 or in a computer cloud node 153. The computer cloud 152 and the computer cloud node 153 will be described in more detailed below.

A scheduling unit 142 is operating in the wireless communications network 100. As will be described in more detail below, the scheduling unit 142 may be comprised in a radio network node, e.g. in the serving radio network node 110 or the target radio network node 112. However, it should be understood that several radio network nodes may each comprise a respective scheduling unit 142. The scheduling unit 142 may be a distributed unit or a central unit of the radio network node. Further, the scheduling unit 142 may be comprised in the CN 102, e.g. as a separate unit or in a central network node of the CN 102. Furthermore, the scheduling unit 142 may be comprised in the external network, e.g. the external network 150 which will be described below. For example, the scheduling unit 142 may be comprised in the external network node, e.g. the external network node 151 which will be described below. As another example, the scheduling unit 142 may be comprised in the computer cloud, e.g. the computer cloud 152 or in the computer cloud node 153. The computer cloud 152 and the computer cloud node 153 will be described in more detailed below.

The wireless communication network, e.g. the CN 102, may further be communicatively connected to, and thereby e.g. provide access for said communication devices, to the external network 150, e.g. the Internet. The wireless device 120 may thus communicate via the wireless communication network 100, with the external network 150, or rather with one or more other devices, e.g. servers and/or other communication devices connected to other wireless communication networks, and that are connected with access to the external network 150.

Moreover, there may be one or more external nodes, e.g. the external node 151, for communication with the wireless communication network 100 and node(s) thereof. The external node 151 may e.g. be an external management node. Such external node may be comprised in the external network 150 or may be separate from this.

Furthermore, the one or more external nodes may correspond to or be comprised in a so called computer, or computing, cloud, that also may be referred to as a cloud system of servers or computers, or simply be named a cloud, such as the computer cloud 152, for providing certain service(s) to outside the cloud via a communication interface. In such embodiments, the external node may be referred to as the cloud node or the cloud network node 153. The exact configuration of nodes etc. comprised in the cloud in order to provide said service(s) may not be known outside the cloud. The name "cloud" is often explained as a metaphor relating to that the actual device(s) or network element (s) providing the services are typically invisible for a user of the provided service(s), such as if obscured by a cloud. The computer cloud 152, or typically rather one or more nodes thereof, may be communicatively connected to the wireless communication network 100, or certain nodes thereof, and may be providing one or more services that e.g. may provide, or facilitate, certain functions or functionality of the wireless communication network 100 and may e.g. be involved in performing one or more actions according to embodiments herein. The computer cloud 152 may be comprised in the external network 150 or may be separate from this.

Figure 2:
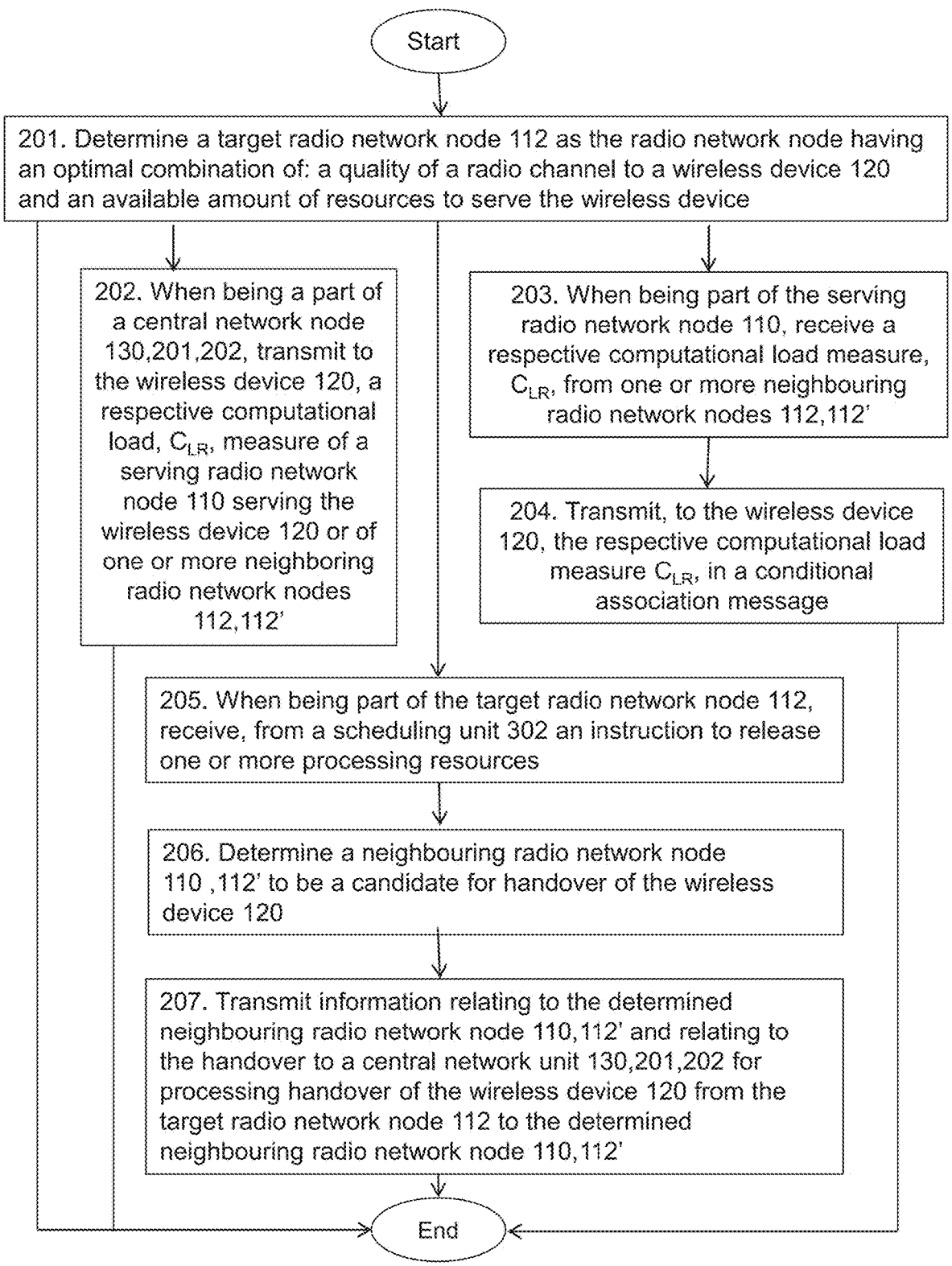
FIG. 2 is a flowchart depicting embodiments of a method performed by a network unit.

An example of a method performed by the network unit 140 for determining a target radio network node 112 will now be described with reference to a flowchart depicted in FIG. 2. As previously mentioned, the network unit 140 and the target radio network node 112 operate in the wireless communications network 100. Further, and as also previously mentioned, the network unit 140 may be comprised in a radio network node such as the serving radio network node 110, the target radio network node 112 or a neighbouring radio network node 112'. In some embodiments, the network unit 140 is a distributed or central unit of the radio network node 110,112,112'. Furthermore, and as also previously mentioned, the network unit 140 may be comprised in the CN 102 or the external network 150, e.g. in a cloud network 152.

The target radio network node 112 is for association with the wireless device 120 served by a serving radio network node 110. Thus, the target radio network node 112 may be the network node to which the wireless device 120 is to be handed over from the serving radio network node 110.

The serving radio network node 110 may be a distributed unit of a radio network node. Thus, the serving radio network node 110 may be a gNB-DU.

The method comprises one or more of the following actions. Thus, one or more of the following actions may be optional. Further, it should be understood that the actions may be taken in any suitable order and that some actions may be combined.

Actions 201

In order to determine a target radio network node 112 having an optimal combination of a radio channel quality and an available amount of computational resources for being associated with the wireless device 120, the network unit 140 determines the target radio network node 112 as one radio network node out of a group of radio network nodes 110, 112, 112' operating in the wireless communications network 100. The one radio network node has a combination of a quality of a radio channel to a wireless device 120 and an amount of computational resources available for serving the wireless device 120, that is better than the other radio network nodes out of the group of radio network nodes 110, 112, 112'. Thus, the combination of the quality of the radio channel to the wireless device 120 and the amount of computational resources available for serving the wireless device 120 is better for the target radio network node 112 than for the other network nodes in the group of radio network nodes 110, 112, 112'.

In some embodiments, the network unit 140 determines the target radio network node 112 in three steps. This is to get a good basis for determination of the target radio network node 112. Thus the network unit 140 determines the target radio network node 112 by firstly determining a first set of radio network nodes 110, 112, 112' having a quality of a radio channel to the wireless device 120 above a threshold value. The threshold value may be a variable threshold value. For example, the threshold value may be varied when the radio link quality of the first set of radio network nodes 110, 112, 112' do not meet the threshold. It should be understood that the threshold may be different for different radio network nodes 110, 112, 112'. Thus, a number of thresholds or a range of thresholds may exist. This may for example be the case when none of the existing radio network nodes 110,112, 112' is able meet the predefined link quality threshold, and hence a lower threshold might be needed.

The first set of radio network nodes 110, 112, 112' comprises at least one out of: the serving radio network node 110 or one or more neighbouring radio network nodes 112, 112' operating in the wireless communications network 100. Thus, the first set of radio network nodes 110, 112, 112' may comprise the serving radio network node 110 or one or more neighbouring radio network nodes 112, 112' operating in the wireless communications network 100, but alternatively it may comprise the serving radio network node 110 and one or more neighbouring radio network nodes 112, 112'.

In such embodiments, the network unit 140 may secondly determine a second set of radio network nodes 110, 112, 112' each having a computational load measure, $C_{LR}$, indicating the amount of computational resources the radio network node 110, 112, 112' has available to serve the wireless device 120. The second set of radio network nodes 110, 112, 112' comprises at least one out of the one or more neighbouring network nodes 112, 112'.

Further, in such embodiments, the network unit 140 may thirdly determine the target radio network node 112 as the one radio network node out of the first and second sets having the optimal combination of the radio channel quality with the wireless device 120 and the available amount of computational resources to serve the wireless device. By the expression "the radio network node having an optimal combination of the radio channel quality with the wireless device 120 and the available amount of computational resources to serve the wireless device 120" when used herein means the radio network node having a combination of a quality of the radio channel to the wireless device 120 and an amount of computational resources available for serving the wireless device 120 that is better than the other radio network nodes.

In some embodiments, the network unit 140 determines the target radio network node 112 by combining the first and second sets of radio network nodes 110, 112, 112', by sorting the radio network nodes 110, 112, 112' in ascending order based on their respective combined radio channel quality and available amount of computational resources, and by determining the last radio network node as the target radio network node 112.

The network unit 140 may determine the computational load measure, $C_{LR}$, for the radio network node 110, 112, 112' in different ways. For example, the network unit 140 may determine the computational load measure, $C_{LR}$, for the radio network node 110, 112, 112' as $C_{LR} = N_{CV,t}(N_{SN}, Q_S, D_T)/N_V^{max}(N_{VCPU}^{DU}, D_T)$, wherein $N_{CV,t}(N_{SN}, Q_S, D_T)$ is the number of consumed virtual CPUs (VCPU) per unit time, $N_{SN}$ is the number of wireless devices served by the radio network node 110, 112, 112', $Q_S$ is the quality of the service of the respective served wireless device having a specific latency $D_T$, and $N_V^{max}(N_{VCPU}^{DU}, D_T)$ is the maximum number of available CPUs at the radio network node 110, 112, 112' for the latency $D_T$ given the radio network node's computational capability $N_{VCPU}^{DU}$.

Thus, in some embodiments, the computational load measure $C_{LR}$ is calculated as the ratio between the number of consumed virtual CPUs per unit of time, to the maximum number of available virtual CPUs per unit time.

The latency $D_T$ is the time delay due to user plane latency, control plane latency and/or E2E latency.

By the expression "virtual CPU (VCPU)" when used in this disclosure is meant a physical CPU that is assigned to a virtual machine, and by the expression "consumed virtual CPUs" when used in this disclosure is meant is a fully loaded virtual CPU due to its assignment to a loaded, e.g. active, virtual machine. The virtual machine is an emulation of the radio network node and has specific configurations, i.e. RAM, physical CPU nodes, hard disk etc., which may be used to define the consumed virtual CPUs.

Further, by the expression "the radio network node's computational capability $N_{VCPU}^{DU}$, when used in this disclosure is meant the number of virtual CPUs at the radio network node, e.g. the radio network node 110, 112, 112'.

Additionally or alternatively, the network unit 140 may determine the computational load measure, $C_{LR}$, for a radio network node 110,112,112' as $C_{LR}=N_{SN}/N_{UE}^{max}(N_{VCPU}^{DU}, D_T)$, wherein $N_{SN}$ is the number of wireless devices served by the radio network node (110, 112, 112'), and $N_{UE}^{max}(N_{VCPU}^{DU}, D_T)$ is the maximum number of wireless devices the radio network node 110,112,112' is able to serve, $N_{VCPU}^{DU}$ is the radio network node's computational capability and $D_T$ is the latency time.

Thus, in some embodiments, the computational load measure $C_{LR}$ is calculated as the ratio between served users and maximum number of users that could possibly be served with a certain latency and number of virtual CPU.

As described above, several metrics may be used to define the computational load. For instance, given that a serving radio network node 110, e.g. a gNB, is serving wireless devices, e.g. the wireless device 120, over the bandwidth $B_{BS}$, and depending on the requested services by these wireless devices, the number of served wireless devices, $N_{UE}$, by the same bandwidth differs. The computational load measure CLR may be calculated in several ways, and two examples are given above.

The determination of the target radio network node may be exemplified as firstly finding two sets of radio network nodes, e.g. gNBs, that represent the overall candidates. The first set of potential candidates, e.g. the first set of one or more distributed gNBs such as one or more gNB-DUs, $G_{RCQ}$ comprises candidate radio network nodes having a reasonable Radio Channel Quality (RCQ) to the wireless device, e.g. the wireless device 120, wishing to perform handover. A reasonable channel quality may be identified via minimum threshold (β) of measurement metrics, e.g., Reference Signals Received Power (RSRP), Reference Signals Received Quality (RSRQ), or Signal-to-Interference-plus-Noise Ratio (SINR). Assume that the radio network nodes in the first set $G_{RCQ}$ is sorted based on the aforementioned channel quality measure in ascending way, i.e. the radio network node, such as the gNB-DU, with best channel quality is last. The second set of computational candidates, e.g. gNBs, $G_{CC}$ comprises neighbour radio network nodes with associated $C_{LR}$ that may accept the wireless device 120 to be served right now. The second set $G_{CC}$ is assumed to be sorted in ascending way, such that the radio network node with the most available resources, i.e. the lowest $C_{LR}$ is last. Finally, the serving radio network node, e.g. a central gNB such as the gNB-CU, computes the intersection of the first set $G_{CC}$ and the second set $G_{RCQ}$ to find the final candidate set, which also should be sorted ascendingly. The last radio network node is radio network node, e.g. the gNB-DU, to be the target radio network node, i.e., next node to serve the wireless device 120.

Example

Assume three radio network nodes, e.g. gNB-DUs; G1, G2, G3 that are neighbours of the wireless device 120 that want to start association or handover procedures. The three nodes are characterized as:

G1 has high RCQ and high $C_{LR}$.

G2 has low RCQ and low $C_{LR}$.

G3 has medium RCQ, but satisfy the requirement radio reliability requirement, by checking β, and low $C_{LR}$, hence has available computational resources for serving the wireless device 120.

Conventional association and/or handover schemes would select G1 to be the serving radio network node and does not consider the value of $C_{LR}$. However, according to embodiments disclosed herein the radio network node G3, which has acceptable RCQ and more available computational resources, i.e. a low $C_{LR}$, would be selected as the target radio network node for association with the wireless device served by the serving radio network node.

Action 202

In some embodiments, when the network unit 140 is a part of a central network node 130, 151, 153, the network unit 140, transmits to the wireless device 120, a respective computational load measure, $C_{LR}$, of the serving radio network node 110 serving the wireless device 120 or of the one or more neighbouring radio network nodes 112, 112'. This may be the case when conditional association, e.g. conditional handover, is implemented and is done in order to ensure that all radio network nodes' 110, 112, 112' respective computational load measure $C_{LR}$ is communicated to the wireless device 120. Thereby, the wireless device 120 will receive knowledge about all radio network nodes' 110, 112, 112' respective computational load measure $C_{LR}$ which measures the wireless device 120 will use in the conditional association procedure, e.g. conditional handover procedure.

Thus, the computational load measure of the neighbouring radio network nodes should be considered in an association decision or a handover decision, in addition to original consideration of the channel quality.

Figure 3:
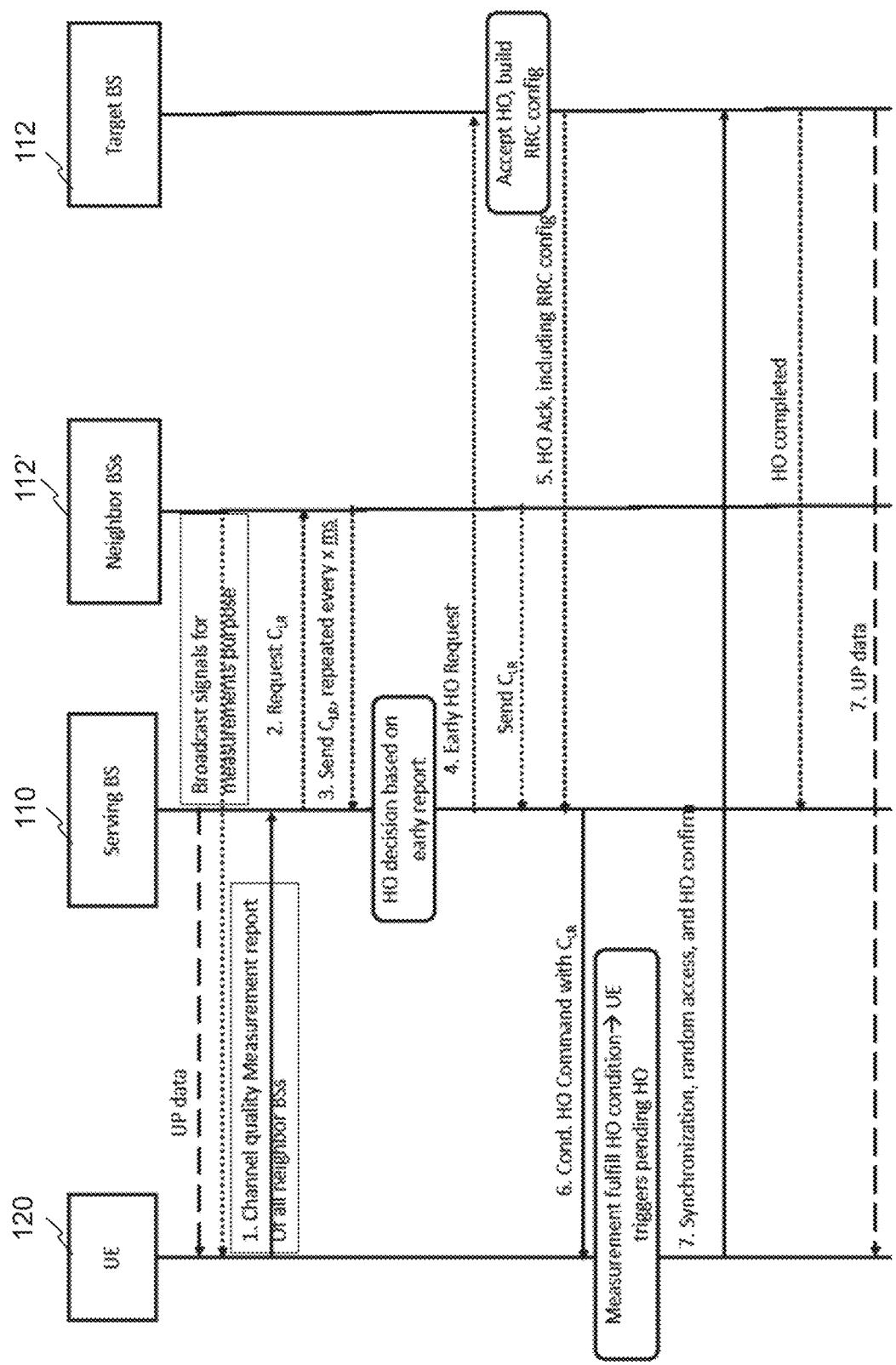
FIG. 3 is a combined block diagram and flowchart depicting embodiments of a method performed in the wireless communications network.
Figure 4:
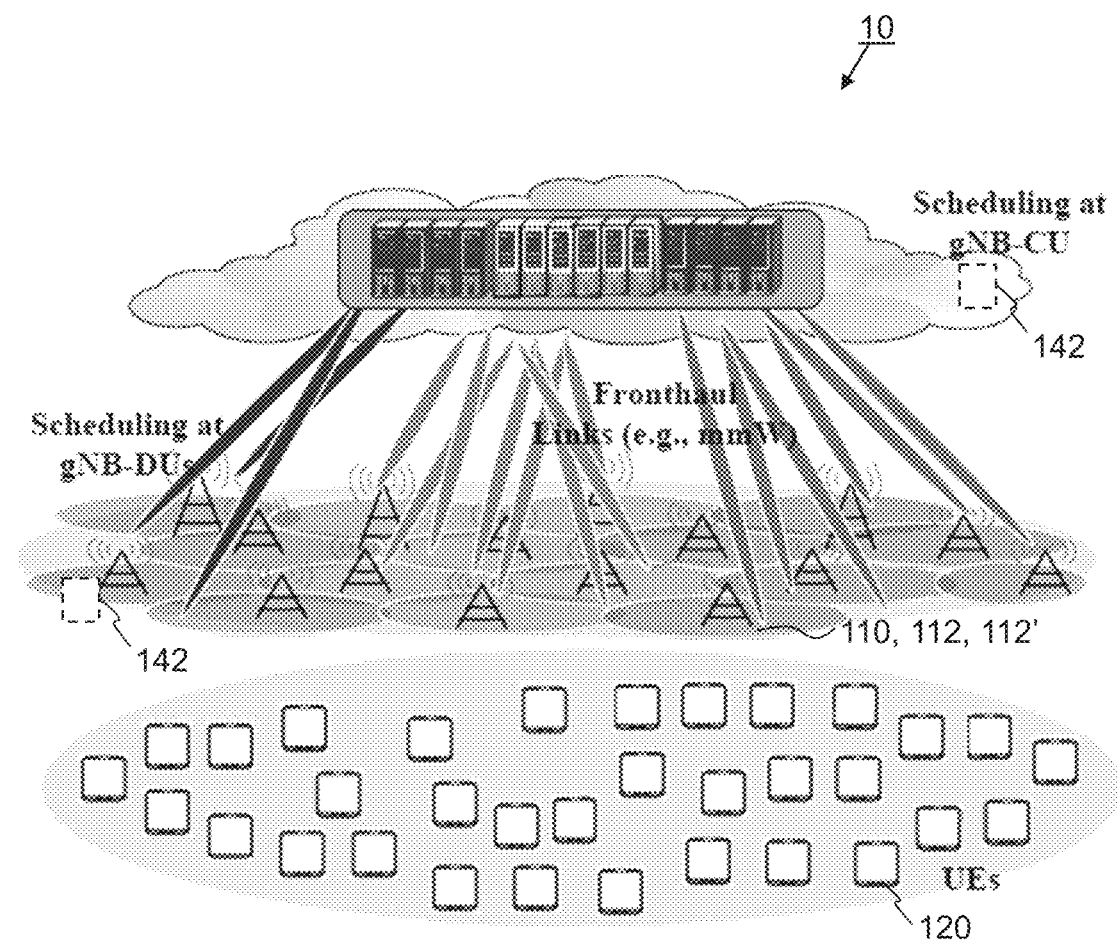
FIG. 4 schematically illustrates embodiments of a wireless communications network.

To further ensure the reduction of serving latency, the change in computational resources availability at all radio network nodes' 110, 112, 112' shall preferably be up-to-date at the wireless device 120. The communication of the computational load measure $C_{LR}$ may be achieved such that the neighbouring radio network nodes 112, 112' may send this value via X2 or S1 interface to the serving radio network node 110, which transmits the computational load measures $C_{LR}$ of all radio network nodes to the wireless device 120. For example, the wireless device 120 may be configured with legacy measurement reporting of the neighbouring radio network nodes 112, 112' that belong to the target cell candidates. The serving radio network node 110 then transmit a message, e.g. RRC message or a MAC CE message, to the wireless device 120 with computational load measure $C_{LR}$ for the candidate radio network nodes 112, 112'. This relates to Action 203 below. In other examples the radio network nodes 110, 112, 112' broadcast $C_{LR}$ as system information. The above procedures are summarized in FIG. 3, which will be described in more detail below. The shown example supports conditional HO, but it may easily apply to existing other Handover (HO) and association schemes. In FIG. 4, it should be noted that the neighbouring radio network nodes 112, 112' still update the $C_{LR}$ because it might take time until the user channel quality satisfies the radio related part of the HO threshold. Within this time the previous computational load measure $C_{LR}$ may be outdated, hence an updated computational load measure $C_{LR}$ is needed to be communicated.

As previously mentioned, the central network node 130, 151, 153 may be the core network node 130, the external network node 151 or the cloud network node 153.

Actions 203

In some embodiments, when the network unit 140 is a part of the serving radio network node 110, the network unit 140 receives a respective computational load measure, $C_{LR}$, from one or more neighbouring radio network nodes 112,112'.

This is also done in order to ensure the reduction of serving latency since the serving radio network node 110 will have up-to-date information of changes in computational resources availability at all neighbouring radio network nodes' 112, 112' and may take action in order to reduce latency by performing an association of the wireless device 120 from the serving radio network node 110 to a neighbouring radio network node 112, 112' when the latency in the serving radio network node 110 is higher than the latency in the neighbouring radio network node 112, 112'.

Actions 204

In some embodiments, when the network unit 140 is a part of the serving radio network node 110, and when the network unit 140 has received the respective computational load measure, $C_{LR}$, from the one or more neighbouring radio network nodes 112,112' as described in Action 203, the network unit 140 transmits the respective computational load measure $C_{LR}$ in a conditional association message to the wireless device 120. Thereby, the reduction of serving latency may be ensured since the wireless device 120 will have up-to-date information of changes in computational resources availability at all radio network nodes' 110, 112, 112' and may take action in order to reduce latency by performing an association to a neighbouring radio network node 112, 112' when the latency in the serving radio network node 110 is higher than the latency in the neighbouring radio network node 112, 112'.

The conditional association message may be a conditional handover message, a an association message, a response message to a wireless device request message, just to give some examples.

It should be understood that the methodology provided herein may be merged with any handover or association mechanism. However, if it is to be implemented with conditional HO, it is required that all neighbouring radio network node's computational load measures, $C_{LR}$, are communicated to the wireless device 120. To further ensure the reduction of serving latency the change in computational resources availability at all radio network nodes 110, 112, 112' must be up-to-date at the wireless device 120. The communication of the computational load measure $C_{LR}$ may be achieved such that neighbouring radio network nodes may send this measure via the X2 interface or the S1 interface to the serving radio network node 110, which transmits the overall $C_{LR}$ to the wireless device 120. For example, the wireless device 120 may be configured with legacy measurement reporting of neighbouring radio network nodes that belong to the target cell candidates. The serving cell, e.g. the serving radio network node 110, then transmits a message, e.g. an RRC message or a MAC CE message to the wireless device 120, which message comprises the computational load measure $C_{LR}$ for the candidate radio network nodes. In other examples the radio network nodes broadcast the computational load measure $C_{LR}$ as system information. The above procedures are exemplified in FIG. 3. FIG. 3 is a combined block diagram and flowchart depicting embodiments of a method performed in a wireless communications network, e.g. in the wireless communications network 100. In FIG. 3, the wireless device 120 is referred to as a UE, the serving radio network node 112 is referred to as a serving BS, the target radio network node 112 is referred to as target BS, and the neighbouring radio network nodes 112' are referred to as Neighbor BSs.

The shown example supports conditional handover, but it may apply to existing other handover schemes and association schemes. In FIG. 3, it should be noted that the neighbouring radio network nodes, e.g. the neighbor gNB-DUs, still update the computational load measure $C_{LR}$ because it might take time until the wireless device's channel quality satisfies the radio related part of the handover threshold, within this time the previous computational load measure $C_{LR}$ might be outdated, hence updated computational load measure $C_{LR}$ has to be communicated.

In some embodiments, a conditional handover configuration message transmitted from the serving radio network node 110 to the wireless device 120 may comprise an instruction to incorporating the computational load measures $C_{LR}$ received from other radio network nodes 112, 112' in a handover decision.

For a radio network node with a high computational load value, the corresponding handover and/or association threshold may be set such that handover and/or association is performed only when it is absolutely necessary such that the wireless device otherwise would get a radio link failure.

Further, it should be noted that if the radio network nodes, e.g. the gNB-DUs, belong to different vendors, it may be desirable to standardize the communication of the computational load measures $C_{LR}$ signal among them and to the handover Mobility Entity (HO-ME).

The calculation of the handover threshold, e.g. a handover threshold value, may take into account the service type of the wireless device 120. For example, for a low latency wireless device that tolerate less reliability, the handover threshold should give more value to the computational load measure $C_{LR}$ as compared to radio channel quality. This may be the case for both condition handover and a legacy handover.

In order to release one or more processing resources from the target radio network node 110 when the wireless device 120 has been handed over to the target radio network node 112 form the serving radio network node 110, the network unit 140 performs the Actions 205-207 which will be described below.

It should be understood that actions described herein may be used together with an existing association scheme or handover scheme. Several handover schemes may be used, such as seamless handover, lossless handover, and conditional handover. One main difference among them is that at conditional handover the wireless device 120 is given the handover command ahead of time of the actual handover happening, such that if wireless device's measurement satisfies the handover threshold sent in the handover command, then the wireless device 120 triggers the pending conditional handover at the targeted cell, e.g. at the target radio network node 112. However, all existing handover schemes base their handover decision on the radio measurement reports of the wireless device 120 sent to service radio network node 110. However, this decision does not take into account the computational load at the serving radio network node 110.

Actions 205

In some embodiments, when the network unit 140 is a part the target radio network node 112, and when the wireless device 120 has been handed over from the serving radio network node 110 to the target radio network node 112, the network unit 140 receives, from a scheduling unit 142 operating in the wireless communications network 100, an instruction to release one or more processing resources from the target radio network node 112.

By the expression "one or more processing resources" when used herein is meant one or more virtual CPUs (VCPUs).

For example, the network unit 140 may be a part of the target radio network node 112 when the network unit 140 is comprised in the target radio network node 112 or when then network unit 140 is a distributed unit of the target radio network node 112.

As previously mentioned, the scheduling unit 142 may be a distributed unit or a central unit of a radio network node 111, 112, 112', or it may be comprised in the central network 102, the external network 150 or in the cloud network 152.

Actions 206

In those embodiments as described in Action 205 above, the network unit 140 further determines a neighbouring radio network node 110,112' to be a candidate for handover of the wireless device 120. As mentioned above, this is done in order to release one or more processing resources from the target radio network node 112 that is serving the wireless device 120 after the handover from the serving radio network node 110 to the target radio network node 112. In such case, the serving radio network node 110 is a neighbouring radio network node to the target radio network node 112. Thus it should be noted that in this scenario the serving radio network node 110 is no longer serving the wireless device 120 and therefore it is sometimes together with the neighbouring radio network nodes 112' referred to as neighbouring radio network nodes 110, 112', e.g. new neighbouring radio network nodes 110, 112', when the target radio network node 112 is serving the wireless device 120.

Actions 207

In those embodiments as described in Actions 205 and 206 above, the network unit 140 further transmits information relating to the determined neighbouring radio network node 110,112' and information relating to the handover to a central network unit 130,151,153 for processing of the handover of the wireless device 120 from the target radio network node 112 to the determined neighbouring radio network node 110,112', whereby one or more processing resources are released.

After finishing the handover procedure or the association procedure, it is still expected from the communications network 100 to keep serving the wireless devices in the most efficient way. Furthermore, it is expected that the wireless devices do not find a radio network node, e.g. a gNB-DU, with available processing resources and acceptable radio channel quality. This may for example be the case when all radio network nodes, e.g. all gNB-DUs, have the same computational load measure $C_{LR}$.

Hence, in the second phase, an aim is to allocate a scheduling unit, e.g. the scheduling unit 142, at either a distributed radio network node, such one out of several gNB-DUs, or a central radio network node such as a gNB-CU, to alleviate processing resources at the newly associated gNB-DU, e.g. the target radio network node 112, and to meet both the wireless device's 120 requirements regarding e.g. latency, throughput, and security, and the communications network's 100 targets regarding energy consumption, security, and dimension.

FIG. 4 schematically illustrates embodiments of a wireless communications system, e.g. the wireless communications system 10. Further, FIG. 4 exemplifies possible schedulers, e.g. one or more scheduling units 142, at one or more radio network nodes, e.g. at central units of the radio network nodes, such as at gNB-CUs, and/or at distributed units of the radio network nodes, such as at gNB-DUs. It should be noted that the multiple gNB-CUs may be placed in a cloud far away from an antenna, e.g. a Receiving unit (RU) and gNB-DUs. The distance between one RU and one gNB-CU may be up to tens of km. The cloud may be the external cloud 150 or the computer cloud 152, just to give some examples. Further, it should also be noted that the gNB-DUs are placed closer to the antenna (RU). Furthermore, multiple gNB-DUs may be controlled via a single gNB-CU. It should be understood that some embodiments comprise a scheduling unit 142 comprised in e.g. an external cloud and acting as a global scheduling unit, one or more scheduling units 142 comprised in one or more central units, e.g. gNB-CUs, and acting as one or more central scheduling units, one or more scheduling units 142 comprised in one or more distributed units, e.g. gNB-DUs, and acting as one or more distributed scheduling units.

The scheduling problem is an optimization problem that may be solved depending on the objective function and constraints. By the term "objective function" when used herein is meant a function, e.g. a utility function, to be optimized and by the term "constraints" when used herein is meant one or more constraints that are needed to be met while optimizing the objective function. In the following, we describe one example that helps in describing the scheduling optimization problem.

The scheduling framework minimizes the objective function under several constraints. For example, the constraints comprises:

1) Satisfying the service latency requirement of the wireless devices, e.g. the wireless device 120, i.e., $L_{SU}(X, O_C) \leq L_{th}$:
    a. $L_{SU}(X,O_C)$ is the induced latency of scheduling the wireless device, e.g. the wireless device 120, at radio network node X, where $X \in \{gNB\text{-}DU, gNB\text{-}CU\}$, which should be less than the required latency threshold $L_{th}$.
    b. $L_{SU}(X,O_C)$ is function of operation complexity ($O_C$) of the user's reliability and security requirements, since higher reliability and security requirement increases the needed processing for the wireless device.
    c. $L_{SU}(X,O_C)$ also comprises transportation latency of the fronthaul.
2) Satisfying the capacity limit of the gNB-DU's processing resources, i.e., $O_C(U) \leq O_{DU}$
    a. Considering the operation complexity ($O_C(U)$) of all users in a gNB-DU should not except the operation complexity capacity of the associated gNB-DU ($O_{DU}$).
3) Satisfying the radio bandwidth limitation.
    a. The capacity requirements of the users connected to a gNB-DU should not exceed the available capacity resources at this gNB-DU.

Thus, the scheduling framework should meet the latency induced by one or more out of: location of scheduling unit 142 scheduling the wireless device 120, Operation complexity of service of the wireless device 120, the transport latency of fronthaul and/or transportation segment, The distributed radio network nodes', e.g. the gNB-DUs', computation capacity, and/or any bandwidth limitation.

The minimization objective function is a weighted sum of two performance metrics, e.g. energy and error rate. Firstly, the first performance metric is the overall energy consumption of the communications network 100. This comprises the energy of several components, e.g. the radio transmission consumption, the digital units' (BBUs') consumption at either gNB-DUs and gNB-CU. Secondly, the Error rate ER of the wireless device 120 is the second performance metric which comprises several parameters, and the associated operation complexity such as the number of Hybrid Automatic Repeat reQuest (HARQ) retransmission to meet the required reliability, and the coding algorithm and coding rate.

In some embodiments disclosed herein, the scheduling unit 142 should target to optimize metrics that align with wireless device's services requirements and the communications network's design targets.

Figure 5:
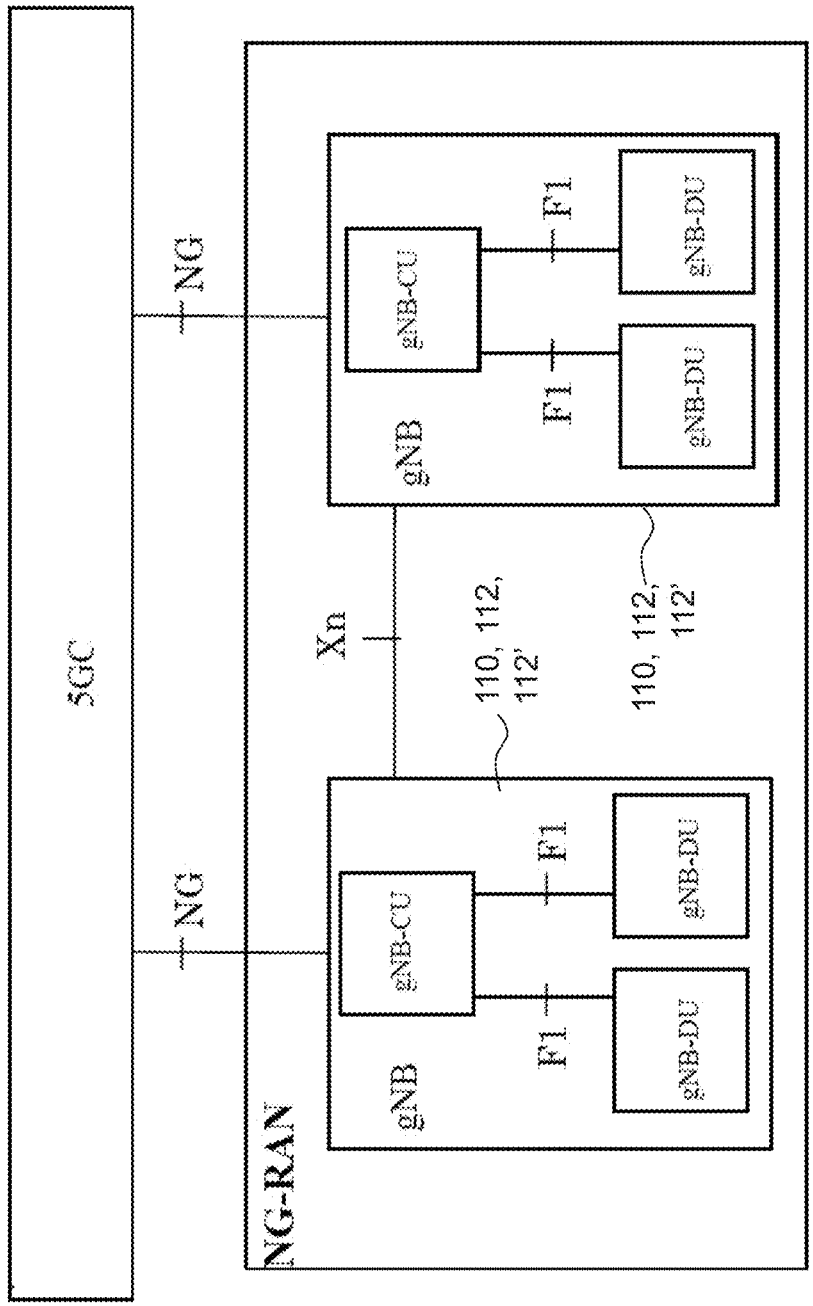
FIG. 5 schematically illustrates an 3GPP NG-RAN architecture wherein embodiments disclosed herein may be implemented.

Further, it should be noted that in both phases described herein there are several signals to be communicated between different network entities, i.e., 5G core (5GC) to gNBs, between gNBs, between gNB-CU and gNB-DU. The interface to transport these signals depends on the place of the unit employing the handover procedures and/or the association procedures or on the place of the unit performing the optimization of the scheduling procedures. FIG. 5 describes the next generation RAN architecture based on 3GPP, wherein embodiments herein may be implemented. For instance, if the scheduling algorithm employed at 5GC, then the NG and F1 interfaces are used to obtain the measurement interfaces and send scheduling command to the gNB-CU/DU. However, if the scheduling and/or HO and/or association are employed at gNB-CU, then the F1 and Xn interfaces are used to transport such signals between CU to DU and CU to CU, respectively.

Figure 6:
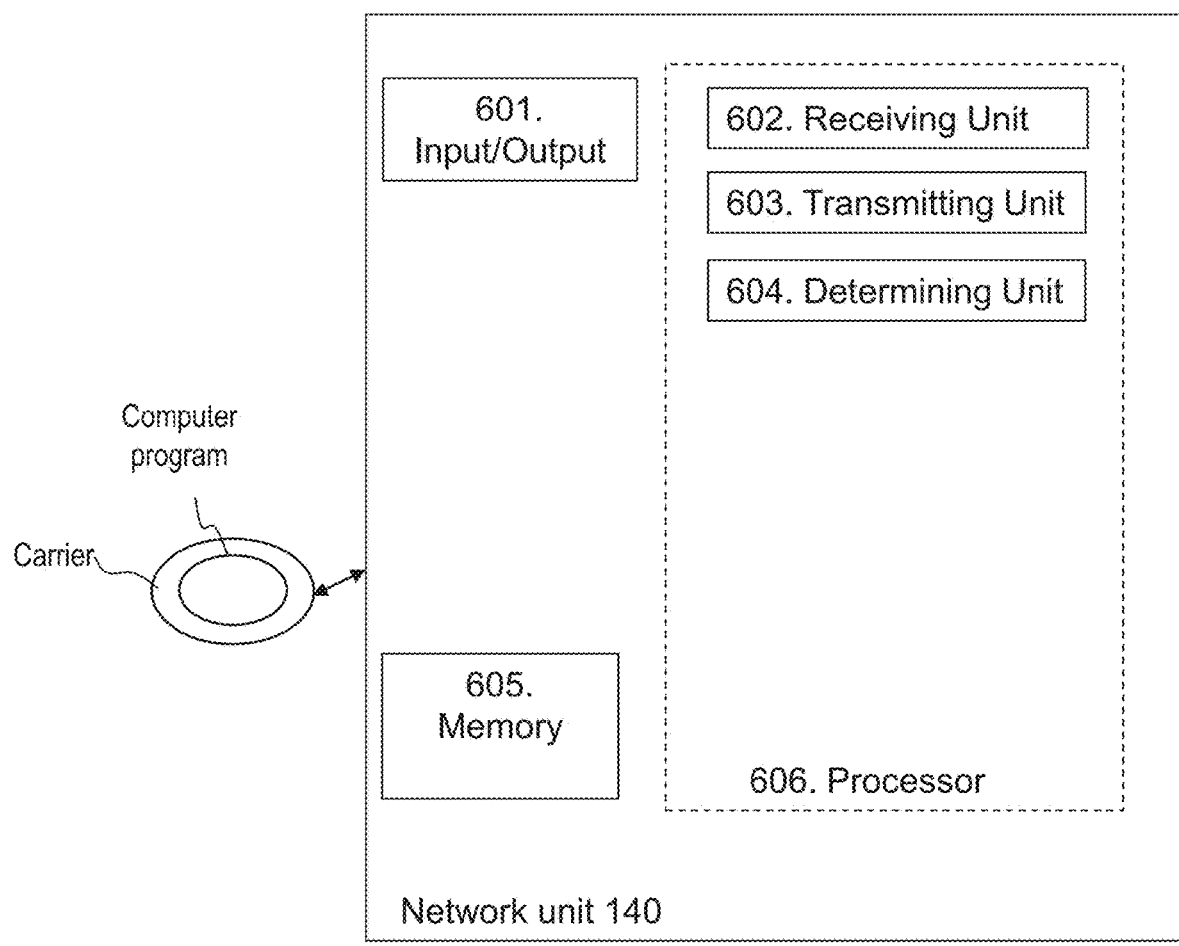
FIG. 6 is a schematic block diagram illustrating embodiments of a network unit.

To perform the method for determining the target radio network node 112, the network unit 140 may be configured according to an arrangement depicted in FIG. 6. As previously mentioned, the network unit 140 and the target radio network node 112 are configured to operate in the wireless communications network 100.

In some embodiments, the network unit 140 comprises an Input and/or output interface 601 configured to communicate with one or more radio network node 110, 112, 112', such as the serving radio network node 110, the target radio network node 112 or one or more neighbouring radio network nodes 112'. The input and/or output interface 301 may comprise a wireless receiver (not shown) and a wireless transmitter (not shown).

The network unit 140 is configured to receive, by means of a receiving unit 602 configured to receive, a transmission, e.g. a data packet, a signal or information, from one or more wireless devices, e.g. from the wireless device 120, or from one or more radio network nodes, e.g. from the radio network nodes 110, 112, 112'. The receiving unit 602 may be implemented by or arranged in communication with a processor 606 of the network unit 140. The processor 606 will be described in more detail below.

In some embodiments, the network unit 140 may be configured to receive a respective computational load measure, $C_{LR}$, from one or more neighbouring radio network nodes 112, 112'. This may be the case when the network unit 140 is configured as a part of the serving radio network node 110.

Further, in some embodiments, the network unit 140 is configured to receive, from a scheduling unit 142 configured to operate in the wireless communications network 100, an instruction to release one or more processing resources from the target radio network node 112. This may be the case when the network unit 140 is a part the target radio network node 112 and when the wireless device 120 has been handed over from the serving radio network node 110 to the target radio network node 112.

The network unit 140 is configured to transmit, by means of a transmitting unit 603 configured to transmit, a transmission, e.g. a data packet, a signal or information, to one or more wireless devices, e.g. to the wireless device 120, and/or to one or more other radio network nodes, e.g. such as radio network nodes 110,112, 112'. The transmitting unit 603 may be implemented by or arranged in communication with the processor 606 of the network unit 140.

In some embodiments, the network unit 140 may be configured to transmit, to the wireless device 120, a respective computational load measure, $C_{LR}$, of the serving radio network node 110 serving the wireless device 120 or of the one or more neighbouring radio network nodes 112, 112'. This may be the case when the network unit 140 is configured as a part of a central network node 130, 151, 153. As previously described, this may be the case when implementing conditional association such as conditional handover.

In some embodiments, the network unit 140 may be configured to transmit the respective computational load measure, $C_{LR}$, in a conditional handover message to the wireless device 120. For example, this may be the case when the network unit 140 is configured as a part of the serving radio network node 110 and when the network unit 140 has received a respective computational load measure, $C_{LR}$, from one or more neighbouring radio network nodes 112, 112'.

Further, in some embodiments, the network unit 140 transmits information relating to the determined new neighbouring radio network node 110, 112' and information relating to the handover to a central network node 130, 151, 153 for processing of the handover of the wireless device 120 from the target radio network node 112 to the determined new neighbouring radio network node 110, 112', whereby one or more processing resources are released. This may be the case when the wireless device 120 has been handed over from the serving radio network node 110 to the target radio network node 112. Thus, in this scenario the serving radio network node 110 is no longer serving the wireless device 120. Instead the target radio network node 112 is serving the wireless device 120. Therefore, the serving radio network node 110 is sometimes together with the neighbouring radio network nodes 112' referred to as neighbouring radio network nodes 110, 112', e.g. new neighbouring radio network nodes 110, 112', when the target radio network node 112 is serving the wireless device 120.

The network unit 140 may be configured to determine, by means of a determining unit 604 configured to determine, the target radio network node 112. The determining unit 604 may be implemented by or arranged in communication with the processor 606 of the network unit 140.

The network unit 140 is configured to determine the target radio network node 112 as one radio network node out of a group of radio network nodes 112,112' configured to operate in the wireless communications network 100 and which one radio network node has a combination of a quality of a radio channel to a wireless device 120 and an amount of computational resources available for serving the wireless device 120, that is better than the other radio network nodes out of the group of radio network nodes 110, 112, 112'.

As previously mentioned, the target radio network node 112 is configured for association with the wireless device 120 served by the serving radio network node 110.

In some embodiments, the network unit 140 is configured to determine the target radio network node 112 by being configured to determine a first set of radio network nodes 112,112' having a quality of a radio channel to the wireless device 120 above a threshold value.

The first set of radio network nodes 110, 112, 112' is configured to comprise at least one out of: the serving radio network node 110 or one or more neighbouring radio network nodes 112,112' configured to operate in the wireless communications network 110.

Further, in such embodiments, the network unit 140 is further configured to determine a second set of radio network nodes 110, 112, 112' each having a computational load measure, $C_{LR}$, indicating the amount of computational resources the radio network node 110, 112, 112' has available to serve the wireless device 120. The second set of radio network nodes 110, 112, 112' may be configured to comprise at least one out of the one or more neighbouring network nodes 112, 112'.

Furthermore, in such embodiments, the network unit 140 is configured to determine the target radio network node 112 as the one radio network node out of the first and second sets having the optimal combination of the radio channel quality with the wireless device 120 and the available amount of computational resources to serve the wireless device 120.

The network unit 140 may be configured to determine the target radio network node 112 by further being configured to combine the first and second sets of radio network nodes 110, 112, 112', sort the radio network nodes 110, 112, 112' in ascending order based on their respective combined radio channel quality and available amount of computational resources; and to determine the last radio network node as the target radio network node 112.

In some embodiments, the network unit 140 is configured to determine the computational load measure, $C_{LR}$, for the radio network node 110, 112, 112' as $C_{LR}=N_{CV,t}(N_{SN}, Q_S, D_T)/N_V^{max}(N_{VCPU}^{DU}, D_T)$, wherein $N_{CV,t}(N_{SN}, Q_S, D_T)$ is the number of consumed virtual CPUs per unit time, $N_{SN}$ is the number of wireless devices served by the radio network node (110, 112, 112'), $Q_S$ is the quality of the service of the respective served wireless device having a specific latency $D_T$, and $N_V^{max}(N_{VCPU}^{DU})$ is the maximum number of available CPUs at the radio network node (110, 112, 112') for the latency $D_T$ given the radio network node's computational capability $N_{VCPU}^{DU}$.

Alternatively or additionally, the network unit 140 may be configured to determine the computational load measure, $C_{LR}$, for a radio network node 110, 112, 112' as $C_{LR}=N_{SN}/N_{UE}^{max}(N_{VCPU}^{DU}, D_T)$, wherein $N_{SN}$ is the number of wireless devices served by the radio network node (110, 112, 112'), and $N_{UE}^{max}(N_{VCPU}^{DU}, D_T)$ is the maximum number of wireless devices the radio network node (110, 112, 112) is able to serve, $N_{VCPU}$DU is the radio network node's computational capability and $D_T$ is the latency time.

In some embodiments, the network unit 140 is configured to determine a new neighbouring radio network node 110, 112' to be a candidate for handover of the wireless device 120. This may be the case when the network unit 140 is a part the target radio network node 112 and when the wireless device 120 has been handed over from the serving radio network node 110 to the target radio network node 112, and when the network unit 140 has received, from a scheduling unit 142 configured to operate in the wireless communications network 100, an instruction to release one or more processing resources from the target radio network node 112. It should be noted that in this scenario the serving radio network node 110 is no longer serving the wireless device 120 and therefore it is sometimes together with the neighbouring radio network nodes 112' referred to as neighbouring radio network nodes 110, 112', e.g. new neighbouring radio network nodes 110, 112', when the target radio network node 112 is serving the wireless device 120.

In some embodiments, the network unit 140 is configured to perform, by means of one or more other units configured to perform one or more further actions described herein. The one or more other units may be implemented by or arranged in communication with the processor 306 of the network unit 140.

The network unit 140 may also comprise means for storing data. In some embodiments, the network unit 140 comprises a memory 605 configured to store the data. The data may be processed or non-processed data and/or information relating thereto. The memory 605 may comprise one or more memory units. Further, the memory 605 may be a computer data storage or a semiconductor memory such as a computer memory, a read-only memory, a volatile memory or a non-volatile memory. The memory is arranged to be used to store obtained information, data, configurations, and applications etc. to perform the methods herein when being executed in the network unit 140.

Embodiments herein for determining a target radio network node 112 may be implemented through one or more processors, such as the processor 606 in the arrangement depicted in FIG. 6, together with computer program code for performing the functions and/or method actions of embodiments herein. The program code mentioned above may also be provided as a computer program product, for instance in the form of a data carrier carrying computer program code for performing the embodiments herein when being loaded into the network unit 140. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the network unit 140.

Those skilled in the art will also appreciate that the input/output interface 601, the receiving unit 602, the transmitting unit 603, the determining unit 604, and the one or more other units above may refer to a combination of analogue and digital circuits, and/or one or more processors configured with software and/or firmware, e.g. stored in the memory 605, that when executed by the one or more processors such as the processors in the network unit 140 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Further Extensions and Variations

Figure 7:
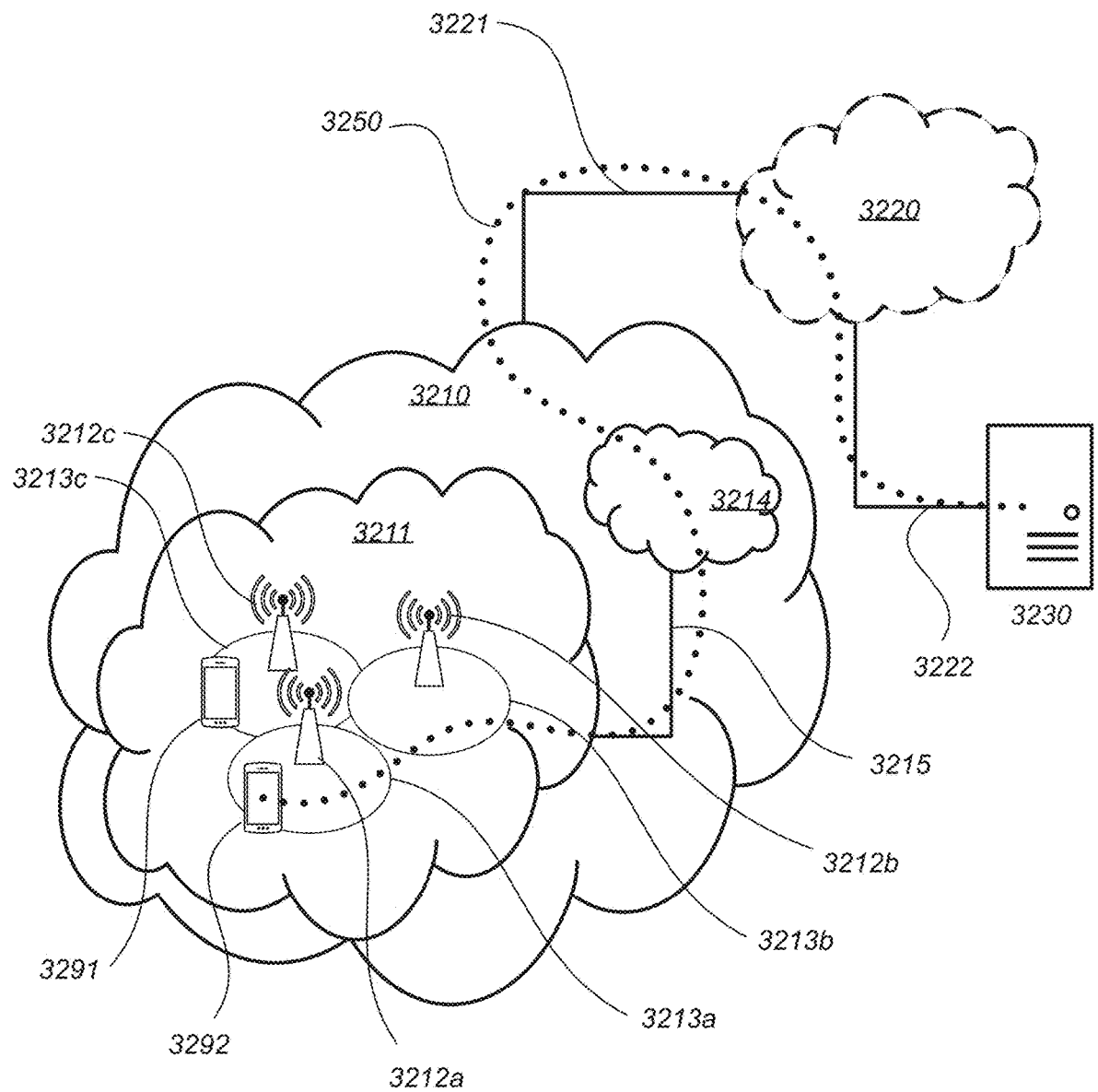

With reference to FIG. 7, in accordance with an embodiment, a communication system includes a telecommunication network 3210 such as the wireless communications network 100, e.g. a WLAN, such as a 3GPP-type cellular network, which comprises an access network 3211, such as a radio access network, and a core network 3214. The access network 3211 comprises a plurality of base stations 3212a, 3212b, 3212c, such as the network node 110, 130, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the wireless device 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 7 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 8:
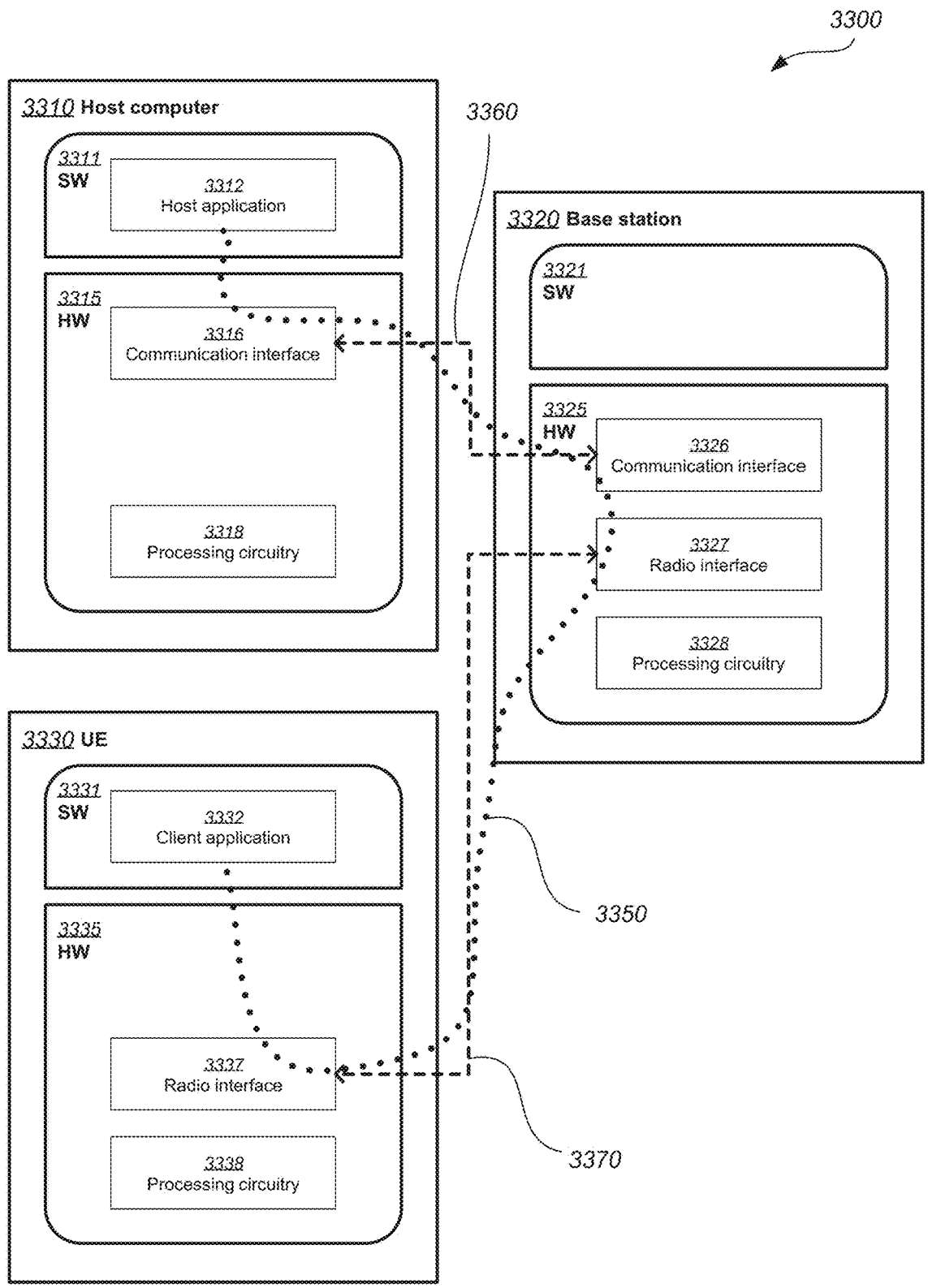

It is noted that the host computer 3310, base station 3320 and UE 3330 illustrated in FIG. 8 may be identical to the host computer 3230, one of the base stations 3212a, 3212b, 3212c and one of the UEs 3291, 3292 of FIG. 7, respectively. This is to say, the inner workings of these entities may be as shown in FIG. 8 and independently, the surrounding network topology may be that of FIG. 7.

In FIG. 8, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the communications system by enabling flexible provisioning of heterogeneous service while meeting their requirements and by alleviating associated constrains on the base station's resources.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 11:
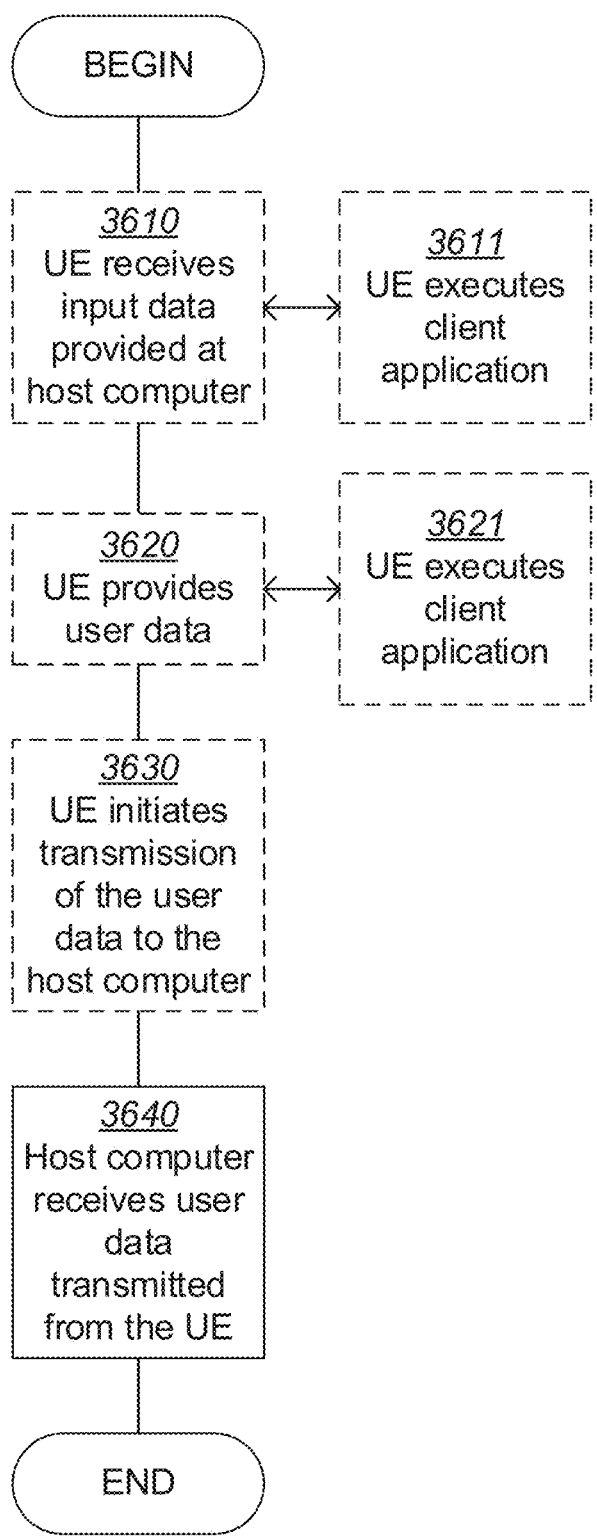
Figure 12:
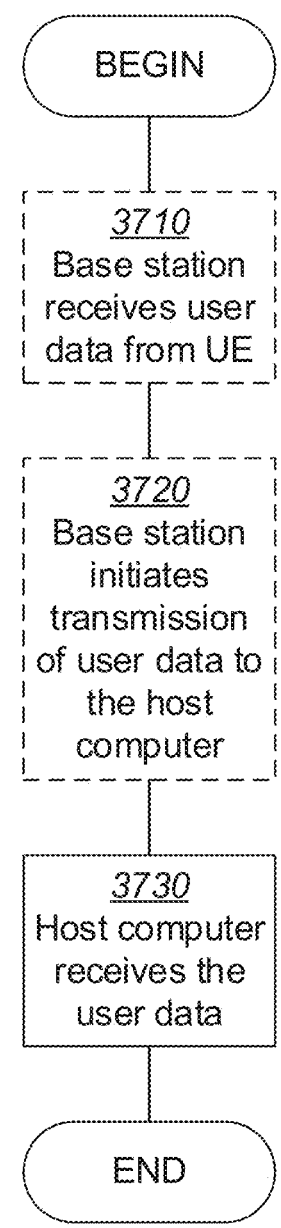

FIGS. 9 and 10 and the corresponding text are about a downstream aspect of the radio-related invention, while FIGS. 11 and 12 and the corresponding text discuss an upstream aspect.

FIG. 9 is a flowchart illustrating a method implemented in a communication system, in accordance with one embodiment. The communication system includes a host computer, a base station such as a AP STA, and a UE such as a Non-AP STA which may be those described with reference to FIGS. 7 and 8. For simplicity of the present disclosure, only drawing references to FIG. 9 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 10 is a flowchart illustrating a method implemented in a communication system, in accordance with one embodiment. The communication system includes a host computer, a base station such as a AP STA, and a UE such as a Non-AP STA which may be those described with reference to FIGS. 7 and 8. For simplicity of the present disclosure, only drawing references to FIG. 10 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 11 is a flowchart illustrating a method implemented in a communication system, in accordance with one embodiment. The communication system includes a host computer, a base station such as a AP STA, and a UE such as a Non-AP STA which may be those described with reference to FIGS. 7 and 8. For simplicity of the present disclosure, only drawing references to FIG. 11 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station such as a AP STA, and a UE such as a Non-AP STA which may be those described with reference to FIGS. 7 and 8. For simplicity of the present disclosure, only drawing references to FIG. 12 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When the word "comprise" or "comprising" is used in this disclosure it shall be interpreted as non-limiting, i.e. meaning "consist at least of".

Modifications and other variants of the described embodiment(s) will come to mind to one skilled in the art having the benefit of teachings presented in the foregoing descriptions and the associated drawings. Therefore, it is to be understood that the embodiment(s) herein is/are not be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method, performed by a network unit, for determining a target radio network node, wherein the network unit and the target radio network node are operating in a wireless communications network; the method comprising:
   determining the target radio network node as one radio network node out of a group of radio network nodes operating in the wireless communications network and which one radio network node has a combination of the following that is better than the other radio network nodes out of the group of radio network nodes:
   a quality of a radio channel to a wireless device; and
   an amount of computational resources available for serving the wireless device;
   wherein the target radio network node is configured for association with the wireless device served by a serving radio network node;
   wherein the determining of the target radio network node comprises:
      determining a first set of radio network nodes having a quality of a radio channel to the wireless device above a threshold value, wherein the first set of radio network nodes comprises: the serving radio network node and/or one or more neighboring radio network nodes operating in the wireless communications network;
      determining a second set of radio network nodes each having a computational load measure ($C_{LR}$) indicating the amount of computational resources the radio network node has available to serve the wireless device, wherein the second set of radio network nodes comprises at least one of the one or more neighboring network nodes; and
      determining the target radio network node as the one radio network node out of the first and second sets having the optimal combination of the radio channel quality with the wireless device and the available amount of computational resources to serve the wireless device.

2. The method claim 1, wherein the determining of the target radio network node further comprises:
   combining the first and second sets of radio network nodes;
   sorting the radio network nodes in ascending order based on their respective combined radio channel quality and available amount of computational resources; and
   determining the last radio network node as the target radio network node.

3. The method of claim 1, further comprising:
   determining the computational load measure, $C_{LR}$, for a radio network node as:

$$C_{LR} = N_{CV,t}(N_{SN}, Q_S, D_T)/N_V^{max}(N_{VCPU}^{DU}, D_T),$$

wherein $N_{CV,t}(N_{SN}, Q_S, D_T)$ is the number of consumed virtual CPUs per unit time, $N_{SN}$ is the number of wireless devices served by the radio network node, $Q_S$ is the quality of the service of the respective served wireless device having a specific latency $D_T$, and $N_V^{max}(N_{VCPU}^{DU}, D_T)$ is the maximum number of available CPUs at the radio network node for the latency $D_T$ given the radio network node's computational capability $N_{VCPU}^{DU}$.

4. The method of claim 1, further comprising:
   determining the computational load measure, $C_{LR}$, for a radio network node as:

$$C_{LR} = N_{SN}/N_{UE}^{max}(N_{VCPU}^{DU}, D_T),$$

wherein $N_{SN}$ is the number of wireless devices served by the radio network node, and $N_{UE}^{max}(N_{VCPU}^{DU}, D_T)$ is the maximum number of wireless devices the radio network node is able to serve, $N_{VCPU}^{DU}$ is the radio network node's computational capability and $D_T$ is the latency time.

5. The method of claim 1:
   wherein the network unit is a part of a central network node; and
   wherein the method further comprises transmitting, to the wireless device, a respective computational load measure ($C_{LR}$) of the serving radio network node serving the wireless device or of the one or more neighboring radio network nodes.

6. The method of claim 1:
   wherein the network unit is a part of the serving radio network node;
   wherein the method further comprises:
      receiving a respective computational load measure ($C_{LR}$) from one or more neighboring radio network nodes; and
      transmitting, to the wireless device, the respective $C_{LR}$ in a conditional association message.

7. The method of claim 1, wherein the network unit is a part the target radio network node, further comprising:
   wherein the network unit is a part the target radio network node;
   wherein the method further comprises, when the wireless device has been handed over from the serving radio network node to the target radio network node:
      receiving, from a scheduling unit operating in the wireless communications network, an instruction to release one or more processing resources from the target radio network node;
      determining a neighboring radio network node to be a candidate for handover of the wireless device; and
      transmitting information relating to the determined neighboring radio network node and information relating to the handover to a central network unit for processing of the handover of the wireless device from the target radio network node to the determined neighboring radio network node, whereby one or more processing resources are released.

8. A network unit for determining a target radio network node, wherein the network unit and the target radio network node are configured to operate in a wireless communications network; the network unit comprising:
   processing circuitry;
   memory containing instructions executable by the processing circuitry whereby the network unit is operative to:
      determine the target radio network node as one radio network node out of a group of radio network nodes configured to operate in the wireless communications network and which one radio network node has a combination of the following that is that is better than the other radio network nodes out of the group of radio network nodes:
a quality of a radio channel to a wireless device; and
an amount of computational resources available for serving the wireless device;
wherein the target radio network node is configured for association with the wireless device served by a serving radio network node;
wherein the determining the target radio network node comprises:
determining a first set of radio network nodes having a quality of a radio channel to the wireless device above a threshold value, wherein the first set of radio network nodes comprises: the serving radio network node and/or one or more neighboring radio network nodes configured to operate in the wireless communications network;
determining a second set of radio network nodes each having a computational load measure ($C_{LR}$) indicating the amount of computational resources the radio network node has available to serve the wireless device, wherein the second set of radio network nodes comprises at least one out of the one or more neighboring network nodes; and
determining the target radio network node as the one radio network node out of the first and second sets having the optimal combination of the radio channel quality with the wireless device and the available amount of computational resources to serve the wireless device.

9. The network unit claim 8, wherein the instructions are such that the network unit is operative to determine the target radio network node by:
combining the first and second sets of radio network nodes;
sorting the radio network nodes in ascending order based on their respective combined radio channel quality and available amount of computational resources; and
determining the last radio network node as the target radio network node.

10. The network unit of claim 8, wherein the instructions are such that the network unit is operative to:
determine the computational load measure ($C_{LR}$) for a radio network node as:

$$C_{LR}=N_{CV,t}(N_{SN},Q_S,D_T)/N_V^{max}(N_{VCPU}^{DU},D_T),$$

wherein $N_{CV,t}(N_{SN},Q_S,D_T)$ is the number of consumed virtual CPUs per unit time, $N_{SN}$ is the number of wireless devices served by the radio network node, $Q_S$ is the quality of the service of the respective served wireless device having a specific latency $D_T$, and $N_V^{max}(N_{VCPU}^{DU}, D_T)$ is the maximum number of available CPUs at the radio network node for the latency $D_T$ given the radio network node's computational capability $N_{VCPU}^{DU}$.

11. The network unit of claim 8, wherein the instructions are such that the network unit is operative to:
determine the computational load measure ($C_{LR}$) for a radio network node as:

$$C_{LR}=N_{SN}/N_{UE}^{max}(N_{VCPU}^{DU},D_T),$$

wherein $N_{SN}$ is the number of wireless devices served by the radio network node, and $N_{UE}^{max}(N_{VCPU}^{DU}, D_T)$ is the maximum number of wireless devices the radio network node is able to serve, $N_{VCPU}^{DU}$ is the radio network node's computational capability and $D_T$ is the latency time.

12. The network unit of claim 8:
wherein the network unit is configured as a part of a central network node; and
wherein the instructions are such that the network unit is operative to transmit, to the wireless device, a respective computational load measure ($C_{LR}$) of the serving radio network node serving the wireless device or of the one or more neighboring radio network nodes.

13. The network unit of claim 8:
wherein the network unit is configured as a part of the serving radio network node; and
wherein the instructions are such that the network unit is operative to:
receive a respective computational load measure ($C_{LR}$) from one or more neighboring radio network nodes; and
transmit, to the wireless device, the respective $C_{LR}$ in a conditional handover message.

14. The network unit of claim 8:
wherein the network unit is a part the target radio network node; and
wherein the network unit further is configured to, when the wireless device has been handed over from the serving radio network node to the target radio network node:
receive, from a scheduling unit configured to operate in the wireless communications network, an instruction to release one or more processing resources from the target radio network node;
determine a neighboring radio network node to be a candidate for handover of the wireless device; and
transmit information relating to the determined neighboring radio network node and information relating to the handover to a central network unit for processing of the handover of the wireless device from the target radio network node to the determined neighboring radio network node, whereby one or more processing resources are released.

15. A non-transitory computer readable recording medium storing a computer program product for controlling a network unit for determining a target radio network node, wherein the network unit and the target radio network node are operating in a wireless communications network; the computer program product comprising software instructions which, when run on processing circuitry of the network unit, causes the network unit to:
determine the target radio network node as one radio network node out of a group of radio network nodes operating in the wireless communications network and which one radio network node has a combination of the following that is better than the other radio network nodes out of the group of radio network nodes:
a quality of a radio channel to a wireless device; and
an amount of computational resources available for serving the wireless device;
wherein the target radio network node is configured for association with the wireless device served by a serving radio network node;
wherein the determining of the target radio network node comprises:
determining a first set of radio network nodes having a quality of a radio channel to the wireless device above a threshold value, wherein the first set of radio network nodes comprises: the serving radio network node and/or one or more neighboring radio network nodes operating in the wireless communications network;

determining a second set of radio network nodes each having a computational load measure ($C_{LR}$) indicating the amount of computational resources the radio network node has available to serve the wireless device, wherein the second set of radio network nodes comprises at least one of the one or more neighboring network nodes; and determining the target radio network node as the one radio network node out of the first and second sets having the optimal combination of the radio channel quality with the wireless device and the available amount of computational resources to serve the wireless device.

* * * * *